United States Patent
Willison et al.

(10) Patent No.: US 11,975,720 B2
(45) Date of Patent: May 7, 2024

(54) ELECTRIC DELIVERY TRUCK CONTROL SYSTEM FOR ELECTRIC POWER MANAGEMENT

(71) Applicant: Workhorse Group Inc., Loveland, OH (US)

(72) Inventors: Robert Willison, Lebanon, OH (US); Donald L. Wires, Loveland, OH (US); Richard E. Bastien, Oxford, MI (US)

(73) Assignee: Workhorse Group Inc., Sharonville, OH (US)

( * ) Notice: Subject to any disclaimer, the term of this patent is extended or adjusted under 35 U.S.C. 154(b) by 0 days.

(21) Appl. No.: 17/862,648

(22) Filed: Jul. 12, 2022

(65) Prior Publication Data

US 2022/0340140 A1    Oct. 27, 2022

Related U.S. Application Data

(63) Continuation of application No. 17/146,369, filed on Jan. 11, 2021, now Pat. No. 11,383,715.

(Continued)

(51) Int. Cl.
*B60W 30/18* (2012.01)
*B60L 58/12* (2019.01)
(Continued)

(52) U.S. Cl.
CPC ....... *B60W 30/18163* (2013.01); *B60L 58/12* (2019.02); *B60W 10/08* (2013.01);
(Continued)

(58) Field of Classification Search
None
See application file for complete search history.

(56) References Cited

U.S. PATENT DOCUMENTS

| | | | | |
|---|---|---|---|---|
| 7,497,285 B1 * | 3/2009 | Radev | ....................... | B60K 6/52 180/65.23 |
| 11,383,715 B2 * | 7/2022 | Willison | ............... | B60W 10/08 |

(Continued)

FOREIGN PATENT DOCUMENTS

EP      2548779 A2    1/2013

OTHER PUBLICATIONS

International Search Report; International Searching Authority; International Patent Application No. PCT/US2021/012987; dated Mar. 24, 2021; 3 pages.

(Continued)

*Primary Examiner* — Todd Melton
*Assistant Examiner* — Jason R Roberson
(74) *Attorney, Agent, or Firm* — Taft Stettinius & Hollister LLP

(57) ABSTRACT

An electric delivery truck control system is disclosed. Sensors detect operation parameters associated with the electric delivery truck as the electric delivery truck maneuvers along the roadway. An electric delivery truck control unit detects electric delivery truck control inputs associated with an operation of the electric delivery truck. The electric delivery truck control inputs are generated from an operation of the electric delivery truck. An operation parameter controller automatically adjusts the operation of the electric delivery truck as the electric delivery truck maneuvers along the roadway to maintain the operation of the electric delivery truck within an operation threshold based on the detected driving parameters and the electric delivery truck control inputs. The operation threshold is the operation of the electric delivery truck that is maintained with an overall power storage of the electric delivery truck thereby enabling the electric delivery truck to execute a route by consuming (Continued)

power stored in the overall power storage of the electric delivery truck.

24 Claims, 6 Drawing Sheets

Related U.S. Application Data

(60) Provisional application No. 62/959,548, filed on Jan. 10, 2020.

(51) Int. Cl.
*B60W 10/08* (2006.01)
*B60W 10/18* (2012.01)
*B60W 50/14* (2020.01)
*G08G 1/16* (2006.01)

(52) U.S. Cl.
CPC ............ *B60W 50/14* (2013.01); *G08G 1/167* (2013.01); *B60W 2050/146* (2013.01); *B60W 2300/12* (2013.01); *B60W 2420/403* (2013.01); *B60W 2520/105* (2013.01); *B60W 2552/20* (2020.02); *B60W 2552/35* (2020.02)

(56) References Cited

U.S. PATENT DOCUMENTS

| | | | |
|---|---|---|---|
| 2004/0016870 A1* | 1/2004 | Pawlicki | G06T 7/13 |
| | | | 315/77 |
| 2005/0232469 A1* | 10/2005 | Schofield | G06V 20/588 |
| | | | 382/104 |
| 2010/0312446 A1 | 12/2010 | Schofield et al. | |
| 2013/0024061 A1 | 1/2013 | Yagura et al. | |
| 2013/0030630 A1* | 1/2013 | Luke | B60L 7/06 |
| | | | 701/22 |
| 2015/0019058 A1 | 1/2015 | Georgiev | |
| 2015/0134174 A1 | 5/2015 | Preece | |
| 2016/0039427 A1 | 2/2016 | Storm et al. | |
| 2016/0190820 A1 | 6/2016 | Chae et al. | |
| 2017/0050535 A1 | 2/2017 | Legris | |
| 2018/0257473 A1* | 9/2018 | Follen | B60W 10/06 |
| 2018/0326929 A1 | 11/2018 | Lurie et al. | |
| 2019/0258251 A1 | 8/2019 | Ditty et al. | |
| 2020/0055402 A1* | 2/2020 | Camhi | B60W 30/18127 |

OTHER PUBLICATIONS

Written Opinion of the International Searching Authority; International Searching Authority; International Patent Application No. PCT/US2021/012987; dated Mar. 24, 2021; 11 pages.

EV Control Unit; Mitsubishi Electric; https://www.mitsubishielectric.co.jp/automotive/tms2017/english/system/pdf/ev_control_unit.pdf; (last visited Jun. 28, 2021).

Battery Management Unit; Mitsubishi Electric; https://www.mitsubishielectric.co.jp/automotive/tms2017/english/system/pdf/battery_management_unit.pdf; (last visited Jun. 28, 2021).

Supplementary European Search Report, European Patent Office, European Patent Application No. 21710383.7, dated Nov. 12, 2021, 11 pages.

"Handbuch Fahrerassistenzsysteme : Grundlagen, Komponenten und Systeme für aktive Sicherheit und Komfort, Chapter 10: Fahrdynamik-Sensoren für FAS; Chapter 21: Gestaltung van Mensch-Maschine-Schnittstellen; Chapter 23: Anzeigen für Fahrerassistenzsysteme; Chapter 24: Fahrerwarnelemente; Chapter 29: 2", Jan. 1, 2009, ISBN: 978-3-8348-0287-3.

\* cited by examiner

ELECTRIC DELIVERY TRUCK CONTROL SYSTEM FOR ELECTRIC POWER MANAGEMENT

CROSS-REFERENCE TO RELATED APPLICATIONS

The present application is a continuation application of, and claims the benefit of, U.S. application Ser. No. 17/146,369, which was filed on Jan. 11, 2021, and which claims priority to, and the benefit of, U.S. Provisional App. Ser. No. 62/959,548 entitled "ELECTRIC DELIVERY TRUCK CONTROL SYSTEM FOR ELECTRIC POWER MANAGEMENT," which was filed on Jan. 10, 2020. The contents of those applications are incorporated by reference herein in their entireties.

BACKGROUND

Field of Disclosure

The present disclosure generally relates to electric delivery trucks and specifically to an electric control system for electric power management of the electric delivery truck.

Related Art

Conventional electric delivery truck control systems for electric delivery trucks that operate on roadways enable the driver of the electric delivery truck to operate the electric delivery truck as the driver requests to operate the electric delivery truck without any intervention. The driver presses the accelerator whenever the driver request to accelerate and presses on the brake whenever the driver requests to brake without any concern as to the electric power consumption of the electric delivery truck. The driver of an electric delivery truck typically executes a delivery route that requires the driver to execute multiple stops along the delivery route to complete each of the required deliveries resulting in numerous abrupt accelerations and numerous abrupt brakings throughout the delivery route which are then compounded each day that the delivery route is executed without any type of intervention.

However, two different drivers may operate identical electric delivery trucks and maneuver the identical electric delivery trucks along identical routes of the identical roadway and be exposed to identical operating conditions and travel identical distances. The first driver may operate the electric delivery truck with significantly less electric power consumption than the second driver. Despite the identical driving environments, the first driver may operate the electric delivery truck differently from the second driver thereby conserving significantly more electric power consumption simply based on how the first driver operates the electric delivery truck as compared to the second driver.

Any type of adjustment executed by a driver with regard to how the driver operates the electric delivery truck as the driver maneuvers the electric delivery truck along the roadway is simply conventionally executed by the natural intelligence of the driver. The first driver has significantly less electric power consumption than the second driver simply by the decisions actually executed by the first driver. For example, the first driver applies the brake significantly less than the second driver who rides the break, the first driver coasts to a stop rather than the second driver abruptly applying to the stop, and the first driver accelerates quickly in passing and then cruises to a coasting speed while the first driver slowly accelerates and passes. Such decisions are manually executed by the first driver and results in significantly less electric power consumption than the decisions of the second driver. Thus, any additional decrease in electric power consumption is conventionally done by the manual decision making process of the driver and those decisions are not automatically executed by the conventional electric delivery truck control systems.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number typically identifies the drawing in which the reference number first appears.

Figure 5:
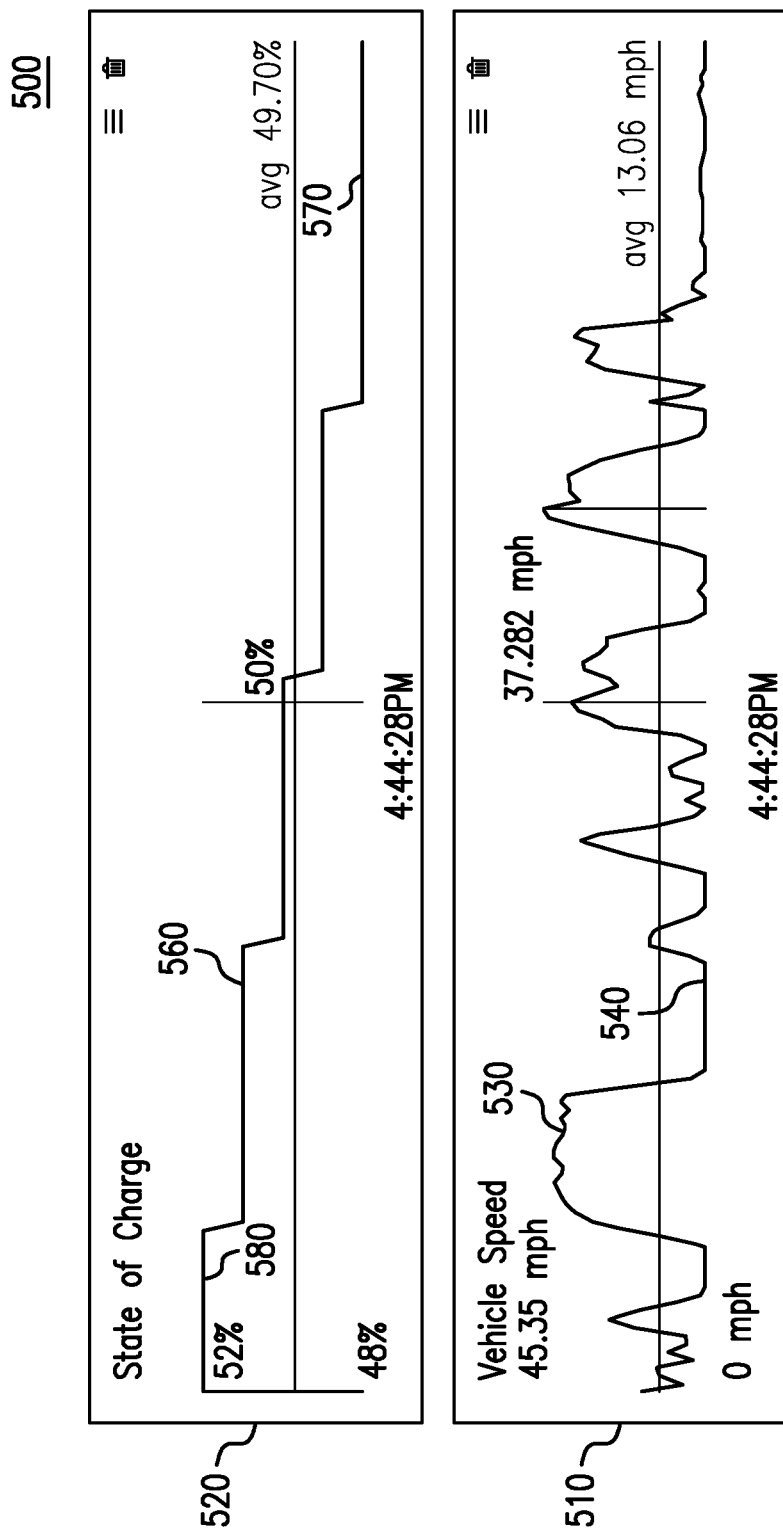
Figure 6:
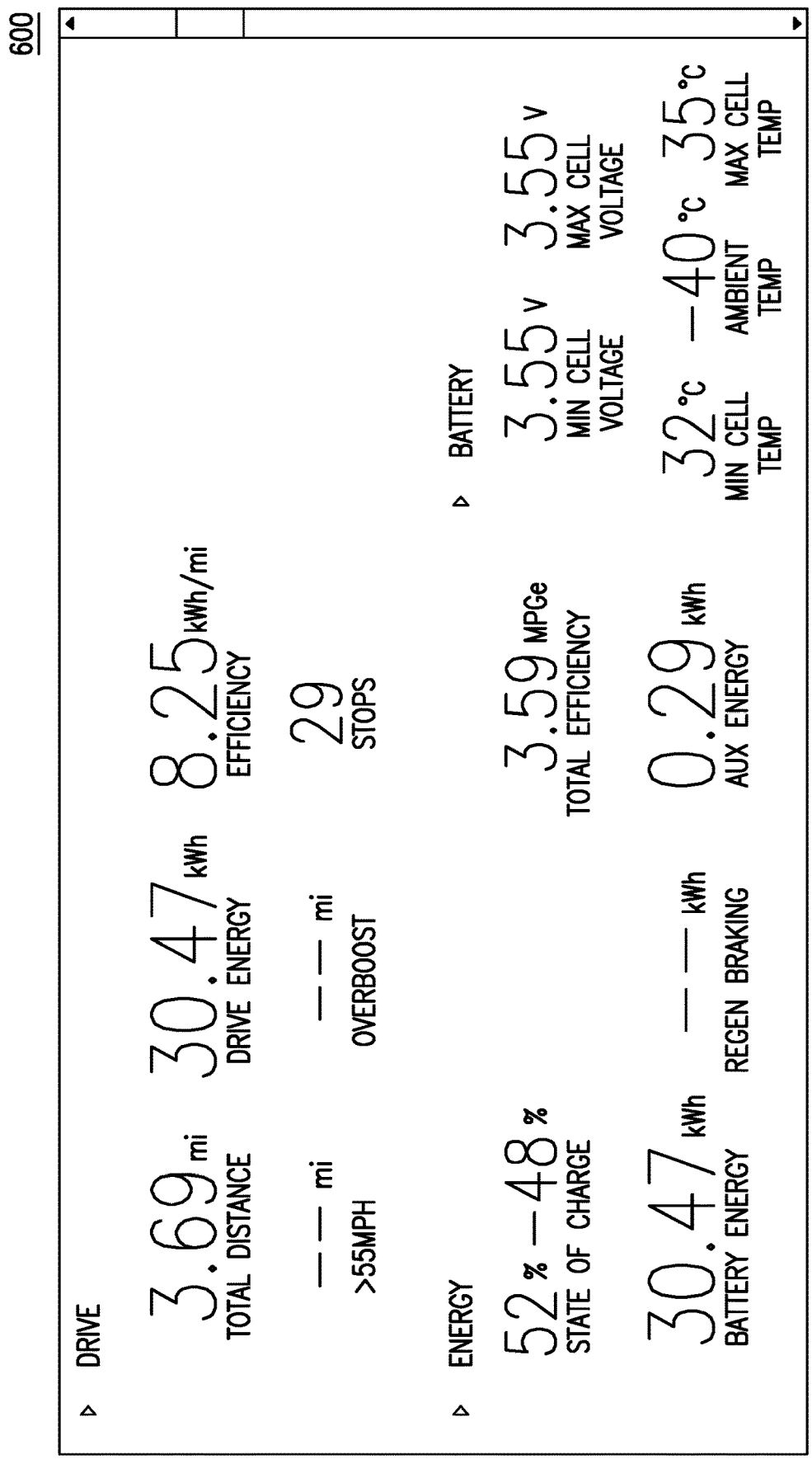

FIG. 5 illustrates an electric delivery truck monitoring configuration that may monitor the battery management input of state of charge as well as the operation parameter of vehicle speed as the electric delivery truck executes the route; and FIG. 6 illustrates an electric truck delivery monitoring configuration that may display to the user via user interface numerous different operation parameters that include the battery management inputs as the electric delivery truck operates.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

System Overview

Figure 1:
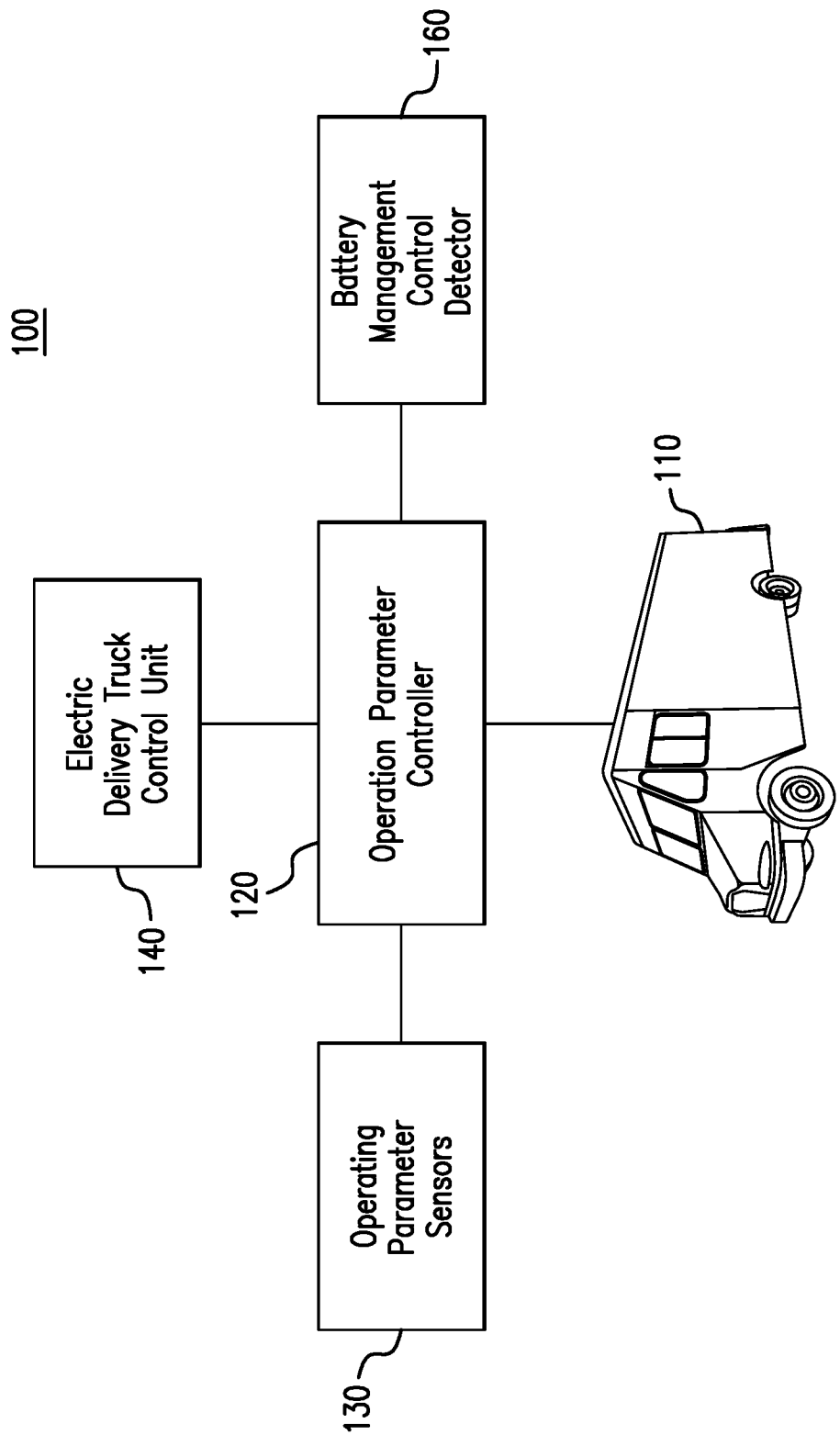
FIG. 1 illustrates a block diagram of an electric delivery truck control system that may manage the power consumed and/or stored by the electric delivery truck as the electric delivery truck operates on a roadway.

FIG. 1 illustrates a block diagram of an electric delivery truck control system that may manage the power consumed and/or stored by the electric delivery truck as the electric delivery truck operates on a roadway. An electric delivery truck control configuration 100 includes an electric delivery truck 110 that may maneuver along a roadway. The electric delivery truck 110 is a motorized truck with wheels that is powered by electric power that is stored in the overall power storage of the electric delivery truck and maneuvers along the roadway that is positioned on the ground such that the wheels maintain contact with the roadway as the wheels rotate from the propulsion of a motor and the electric delivery truck 110 then maneuvers along roadway via the rotation of the wheels. For example, the electric delivery truck 110 may include but is not limited to electric trucks with Gross Vehicle Weight Ratings (GVWR) in class 3, class 4, class 5 and/or any other electric trucks included in any other GVWR classifications that will be apparent to those skilled in the relevant art(s) without departing from the spirit and scope of the disclosure.

An operation parameter controller 120 may automatically adjust the operation of the electric delivery truck 110 as the electric delivery truck 110 maneuvers along the roadway. Rather than the driver simply being able to operate the electric delivery truck 110 as the driver desires such as with abrupt accelerations and/or abrupt brakings, the operation parameter controller 120 may automatically adjust the operation of the electric delivery truck 110 such that the operation parameter controller 120 automatically adjusts the operation of the electric delivery truck 110 such that the electric delivery truck 110 operates within an overall power storage of the electric delivery truck 110. As the operation of the electric delivery truck 110 dynamically changes, the operation parameter controller 120 may automatically adjust the operation of the electric delivery truck 110 in response to the dynamically changing operation of the electric delivery truck 110 to ensure that the electric delivery truck 110 executes a route by consuming power stored in the overall power storage of the electric delivery truck 110 without exceeding such overall power storage. The overall power storage of the electric delivery truck 110 is the electric power that is generated and/or stored on board the electric delivery truck 110 as the electric delivery truck 110 operates in a power storage device, such as an electric battery storage pack. As the electric delivery truck 110 operates, the electric delivery truck 110 consumes and/or generates electric power that is stored in the overall power storage. The operation parameter controller 120 may then ensure that the operation of the electric delivery truck 110 when executing the route is maintained to consume the electric power stored in the overall power storage device.

The operation parameter controller 120 may automatically adjust the operation of the electric delivery truck 110 based on a plurality of operation parameter sensors 130 that detect a plurality of operation parameters that are indicative to operation of the electric delivery truck 110 is operating and may change dynamically as the electric delivery truck 110 maneuvers along the roadway. As the operation parameters detected by the operation parameter sensors 130 change, the operation parameter controller 120 may automatically adjust the operation of the electric delivery truck 110 to accommodate the dynamic change in the operation parameters to maintain the operation of the electric delivery truck 110 within the overall power storage of the electric delivery truck 110. In doing so, enabling the electric delivery truck 110 to execute the route by consuming power stored in the overall power storage of the electric delivery truck 110. Often times, the electric delivery truck 110 may execute a route that requires the electric delivery truck 110 to execute numerous deliveries during the route. The operation parameter controller 120 may ensure that the operation of the electric delivery truck 110 ensures that the electric delivery truck 110 is able to complete the numerous deliveries included on the route from without having to deplete the power stored in the overall power storage thereby requiring that the electric delivery truck 110 to charge the overall power storage before the completion of the route.

The operation parameter controller 120 may also automatically adjust the operation of the electric delivery truck 110 based on a plurality of electric delivery truck control inputs that are generated from an operation of the electric delivery truck 110 and may change dynamically as the driver operates the electric delivery truck 110 along the roadway. The electric delivery truck control inputs may be detected by an electric delivery truck control unit 140. As the driver of the electric delivery truck 110 adjusts the operation of the electric delivery truck 110, the operation parameter controller 120 may automatically adjust the operation of the electric delivery truck 110 to accommodate the dynamic change in the electric delivery truck control inputs generated by the driver operating the electric delivery truck 110 to thereby ensure that the power consumed by the electric delivery truck 110 when executing the route is maintained with the overall power storage of the electric delivery truck 110.

The operation parameter controller 120 may automatically adjust the operation of the electric delivery truck 110 as the electric delivery truck 110 maneuvers along the roadway to maintain the operation of the electric delivery truck 110 within an operation threshold based on the detected operation parameters and electric delivery truck control inputs. The operation threshold is the operation of the electric delivery truck 110 that is maintained within an overall power storage of the electric delivery truck 110 thereby enabling the electric delivery truck 110 to execute a route by consuming power stored in the overall power storage of the electric delivery truck 110.

The operation parameter controller 120 may automatically adjust the operation of the electric delivery truck 110 as the electric delivery truck 110 maneuvers along the roadway to maintain the operation of the electric delivery truck 110 within the operation threshold of the overall power storage of the electric delivery truck 110. As the electric delivery truck 110 maneuvers along the roadway, the geometry of the roadway may change. The geometry of the roadway are the dimensions, curvature, and/or grade of the roadway. For example, the geometry of the roadway includes but is not limited to the width of the roadway, the quantity of lanes of the roadway, the width of each lane of the roadway, the grade of the roadway, the curvatures of the roadway, and/or any other type of geometry of the roadway will be apparent to those skilled in the relevant art(s) without departing from the spirit and scope of the disclosure.

Figure 2:
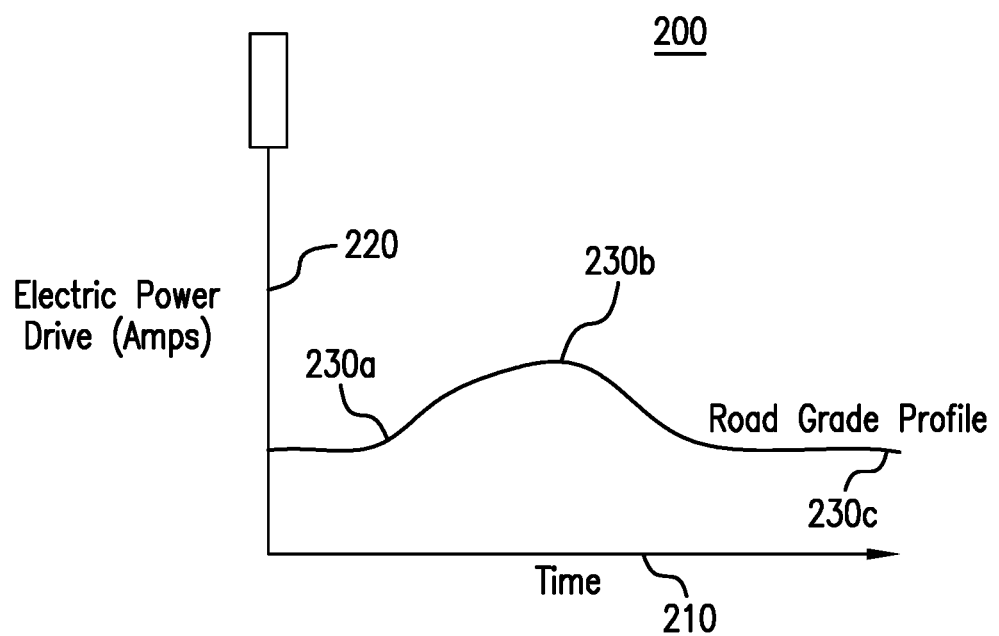
FIG. 2 illustrates a roadway segment configuration that depicts the geometry of the roadway changes as the grade of the roadway changes.

As the geometry of the roadway changes, the operation of the electric delivery truck 110 in order to adapt to the change of the geometry of the roadway also changes. For example, as shown in a roadway segment configuration 200 as depicted in FIG. 2, the geometry of the roadway changes as the grade 230(a-c) of the roadway changes. In such an example, the operating speed of the electric delivery truck 110 may significantly decrease as the driver of the electric delivery truck 110 attempts to transition from the flat grade 230a and to climb to the top grade 230b and the electric power drive (A) 220 may then significantly increase as the electric delivery truck 110 transitions from the top grade 230b to the flat grade 230c and the operating speed may then level out as the electric delivery truck 110 maneuvers along the flat grade 230c.

As the operation of the electric delivery truck 110 changes in order to adapt to the change of the geometry of the roadway, the amount of electric power drive 220 provided from the overall power storage to drive the electric delivery truck 110 also changes. The amount of electric power drive 220 provided from the overall power storage to drive the electric delivery truck 110 to encounter the change of grade 230(a-c) in FIG. 2 is different from the amount of electric power drive 220 provided from the overall power storage to drive the electric delivery truck 110 for each change in grade. For example, the electric delivery truck 110 may steadily increase the amount of electric power drive 220 provided from the overall power storage to drive the electric delivery truck 110 as the electric delivery truck 110 attempts to compensate for the decrease in operating speed as the electric delivery truck 110 transitions from the flat grade 230a and to climb to the top grade 230b and the amount of electric power drive 220 provided from the overall power storage to drive the electric delivery truck may then steadily decrease as the electric delivery truck 110 increases in operating speed as the electric delivery truck 110 transitions from the top grade 230b to the flat grade 230c.

As noted above, the operation parameter controller 120 may automatically adjust the operation of the electric delivery truck 110 to automatically adjust the operation of the electric delivery truck 110 as the electric delivery truck 110 maneuvers along the roadway to maintain the operation of the electric delivery truck 110 within an operation threshold. The operation threshold is the operation of the electric delivery truck 110 that maintains the operation of the electric delivery truck 110 within the overall power storage of the electric delivery truck 110 thereby enabling the electric delivery truck 110 to execute a route by consuming power stored in the overall power storage of the electric delivery truck 110. Rather than simply having power provided by the overall power storage to drive the electric delivery truck 110 at a constant power level, the operation parameter controller 120 may automatically adjust the amount of power provided by the overall power storage to drive the electric delivery truck 110 to operate within an operation threshold for power consumed by the electric delivery truck 110 as provided by the electric power storage.

The adjustment to the operation of the electric delivery truck 110 has conventionally been implemented by the natural intelligence of the driver. However, any type of adjustment due to the natural intelligence of the driver obviously is limited to the natural intelligence of the driver but also any type of adjustment due to the natural intelligence of the driver is done by the perception of the driver. For example, a driver with a higher level of natural intelligence may recognize that continuing to press on the accelerator to maintain the operating speed when climbing a steep incline may actually have a negative impact on the electric power consumption of the electric delivery truck 110 as provided by the overall power storage. However, such a driver may decrease the amount of pressure on the accelerator simply by the what the driver perceives as the appropriate amount of pressure to put on the accelerator. Such a perception may not be the actual amount of acceleration to give the electric delivery truck 110 in order to decrease the electric power consumption of the electric delivery truck 110 and again is limited to the natural intelligence of the driver and the driver may not continuously execute the appropriate adjustments to the operation of the electric delivery truck 110. Thus, the operation parameter controller 120 may significantly decrease the electric power consumption of the electric delivery truck 110 by continuously adjusting the operation of the electric delivery truck 110.

The operation parameter controller 120 may be a device that is capable of electronically communicating with other devices. Examples of the operation parameter controller 120 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Sensor Detection Configuration

Figure 3:
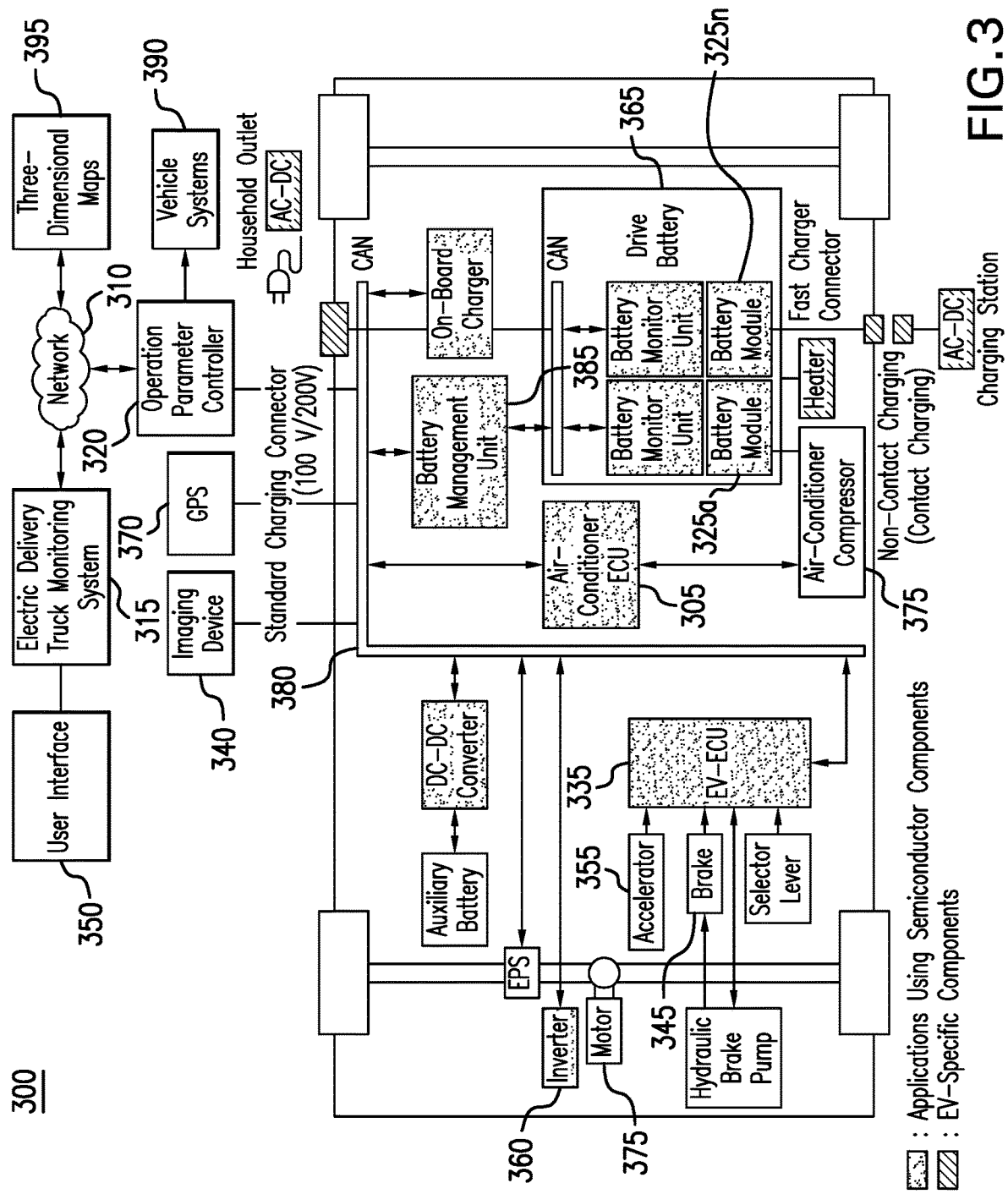
FIG. 3 illustrates a block diagram of an electric delivery truck control system that automatically maintains the operation of the electric delivery truck within the operation threshold to ensure that the power consumed by the electric delivery truck is maintained within the overall power storage of the electric delivery truck.

FIG. 3 illustrates a block diagram of an electric delivery truck control system that automatically maintains the operation of the electric delivery truck 110 within the operation threshold to ensure that the power consumed by the electric delivery truck 110 is maintained within the overall power storage 365 of the electric delivery truck 110. An electric delivery truck control system configuration 300 includes a plurality of sensors that are associated with the electric delivery truck 110. The sensors include but are not limited to a imaging device 340, a global positioning system (GPS) 370, and a control area network (CAN) bus 380. The sensors detect operation parameters associated with the electric delivery truck 110 as the electric delivery truck 110 operates. Additional operation parameters may be detected via the connection to the network 310. The operation parameter controller 320 may then incorporate the operation parameters into the automatic adjustment of the electric delivery truck 110 as the electric delivery truck 110 operates. In doing so, the operation parameter controller 320 may adjust the vehicle systems 390 of the electric delivery truck 110. The electric delivery truck control configuration 300 shares many similar features with the electric delivery truck control configuration 100; therefore, only the differences between the electric delivery truck control configuration 300 and the electric delivery truck control configuration 100 are to be discussed in further detail.

A plurality of sensors, such as but not limited to the imaging device 340, the GPS 370, the CAN bus 380, and so on, are associated with the electric delivery truck 110 that maneuvers along the roadway. The sensors detect a plurality of operation parameters associated with the electric delivery truck 110 as the electric delivery truck 110 maneuvers along the roadway. The operation parameters are indicative to an operating environment that the electric delivery truck 110 is operating. The operation parameters provide insight to the operation parameter controller 320 as to the how the electric delivery truck 110 is currently operating such that the operation parameter controller 320 may then incorporate the operation parameters into the automatic adjustment of the operation of the electric delivery truck 110 to account for the current operation of the electric delivery truck 110 as the electric delivery truck 110 maneuvers along the roadway.

For example, the operation parameters provide insight as to the current operation of the electric delivery truck 110 such as but not limited to the acceleration of the electric delivery truck 110, braking, wheel speed, speed of the electric delivery truck 110, and so on. The operation parameters may also provide insight as to the current terrain that the electric delivery truck 110 is operating such as the grade of the roadway, the map of the roadway, and so on. The operation parameters may also provide insight as to the electric power consumption of the electric delivery truck 110 such as but not limited to the current voltage of the drive battery 365, acceleration relative to amount of Amps being drawn to support the speed of the electric delivery truck 110, state of charge of the drive battery 365, the temperature of the drive battery 365, electric power efficiency of the electric delivery truck 110 in Miles per Gallon Gasoline Equivalent (MPGe), and so on. The operation parameters may include but are not limited to acceleration, deceleration, electric delivery truck speed, wheel speed, position of the electric delivery truck, maps, roadway grade, YAW, cabin air temperature, cabin air pressure, voltage of the drive battery, motor acceleration relative to amount of Amps being drawn, state of charge of the drive battery, the temperature of the drive battery, MPGe, and/or any other type of operation parameter that is indicative to the operation electric delivery truck 110 that will be apparent to those skilled in the relevant art(s) without departing from the spirit and scope of the disclosure.

The operation parameter controller 320 may then automatically adjust the operation of the electric delivery truck 110 as the electric delivery truck 110 maneuvers along the roadway to maintain the operation of the electric delivery truck 110 within the operation threshold based on the detected operation parameters. Each of the numerous operation parameters detected by the sensors may enable the operation parameter controller 320 to automatically adjust the operation of the electric delivery truck 110 to accommodate each of the numerous operation parameters that may be impacting the operation of the electric delivery truck 110.

Rather than simply having the electric delivery truck 110 operate with a set power level provided by the drive battery 365 to drive the electric delivery truck 110, the operation parameter controller 320 may identify each operation parameter and the corresponding impact of that operation parameter on the operation of the electric delivery truck 110 and then automatically adjust the operation of the electric delivery truck 110. In doing so, the operation parameter controller 320 may automatically adjust the vehicle systems 390 of the electric delivery truck 110. The vehicle systems 390 are the systems of the electric delivery truck 110 that when adjusted trigger the electric delivery truck 110 to operate accordingly. For example, the vehicle systems 390 may include but are not limited to the engine controller, brakes, steering, and/or any other type of system of the electric delivery truck 110 that trigger the electric delivery truck 110 to operate.

The imaging device 340 detects a plurality of visual detection operation parameters that are associated with the electric delivery truck 110 as the electric delivery truck 110 maneuvers along the roadway. The visual detection operation parameters are operation parameters that are visually identifiable as detected by the imaging device 340 and are indicative to the operation of the electric delivery truck 110. The road looking camera 340, may detect numerous visual detection operation parameters that impact the operation of the electric delivery truck 110 as the electric delivery truck 110 maneuvers along the roadway. The visual detection operation parameters of the operation of the electric delivery truck 110 may include tangible characteristics of the operation of the electric delivery truck 110 that may be visually detected and/or identified by the imaging device 340 such that the driver is not required to visually detect such visual detection operation parameters. Such visual detection operation parameters may provide the operation parameter controller 320 with the insight as to the tangible and/or visually identifiable aspects of the operation of the electric delivery truck 110.

The operation parameter controller 320 may then identify the visual detection operation parameters as detected by the imaging device 340 in real-time as the electric delivery truck 110 maneuvers along the roadway. The operation parameter controller 320 may determine an impact that each of the visual detection operation parameters are having on the operation of the electric delivery truck 110. The operation parameter controller 320 may automatically adjust the operation of the electric delivery truck 110 as the electric delivery truck 110 maneuvers along the roadway to maintain the operation of the electric delivery truck 110 within the operation threshold to accommodate for each of the visual detection operation parameters as each visual detection driving parameter impacts the operation of the electric delivery truck 110 in real-time.

The imaging device 340 may also identify the geometry of the roadway based on the width of the roadway, the amount of lanes of the roadway, as well as provide real-time updates as to the operation of the electric delivery truck 110 relative to the operating lines of the roadway to determine whether the electric delivery truck 110 is operating within the operating lines and/or moving across the operating lines. Such operation parameters provided by the imaging device 340 may enable the operation parameter controller 320 to determine whether the electric delivery truck 110 is safely operating within the operating lines of the roadway.

For example, the operation parameter controller 320 may identify a positon of the electric delivery truck 110 as detected by the imaging device 340 in real-time relative to a lane included in the roadway that the electric delivery truck 110 is maneuvering. The operation parameter controller 320 may then determine when the position of the electric delivery truck 110 deviates beyond a lane center threshold in real-time. The lane center threshold is the position of the electric delivery truck 110 relative to a center position of the lane that when deviated beyond is indicative that the position of the electric delivery truck 110 is deviating from the lane that the electric delivery truck 110 is maneuvering. The operation parameter controller 110 may then automatically alert the driver that the position of the electric delivery truck 110 is deviated beyond the lane center threshold indicating to the driver that the driver is to adjust the position of the electric delivery truck 110 to be within the lane center threshold.

The operation parameter controller 320 may also identify an object positioned in a drive path of the electric delivery truck 110 as the electric delivery truck 110 maneuvers along the roadway. The electric delivery truck 110 may then instruct an electric motor 375 included in the electric delivery truck 110 to transition from operating in a drive mode to a reverse mode to thereby transition the electric motor 375 from operating as the electric motor 375 to operating as an electric generator in response to the identification of the object positioned in the drive path. The operation parameter controller 320 may then automatically decrease the speed of the electric delivery truck 110 due to the electric motor 375 removing power that is available to accelerate the electric delivery truck 110 to storing the captured power in the overall power storage 365 of the electric delivery truck 110 thereby triggering the speed of the electric delivery truck 110 to automatically decrease. The automatic decrease in speed enables a driver of the electric delivery truck 110 to avoid the object positioned in the drive path of the electric delivery truck 110. The imaging device 340 may detect and provide any type of visual detection operation parameter to the operation parameter controller 320 that may enable the operation parameter controller 320 to automatically adjust the operation of the electric delivery truck 110 to account for the impact of the visual detection operation parameter detected by the imaging device that will be apparent to those skilled in the relevant art(s) without departing from the spirit and scope of the disclosure.

Electric Delivery Truck Monitoring Configuration

An electric delivery truck monitoring system 315 may monitor the electric delivery truck 110 as well as the numerous operation parameters associated with the electric delivery truck 110 as the electric delivery truck 110 operates as the electric delivery truck 110 executes the route. The electric delivery truck monitoring system 315 may then provide insight as to the operation of the electric delivery truck 110 in that the operation parameters monitored by the electric delivery truck 110 by the electric delivery truck monitoring system 315 may provide insight as to how the operation of the electric delivery truck 110 may be optimized to increase the MPGe of the electric delivery truck 110 as the electric delivery truck 110 executes the route. In doing so, the operation parameter controller 320 may then adjust the operation of the electric delivery truck 110 based on the monitored operation parameters to increase the MPGe of the electric delivery truck 110 thereby optimizing the amount of power that is consumed by the electric delivery truck 110 as the electric delivery truck 110 executes the route.

The electric delivery truck monitoring system 315 may monitor the numerous operation parameters as detected by the electric delivery truck control unit 335 and detected by the numerous sensors as well as the numerous operation parameters that are provided via the CAN bus 380 of the electric delivery truck 110. The electric delivery truck monitoring system 315 may access the CAN bus 380 via the operation parameter controller 320 and thereby monitor the numerous operation parameter parameters provided via the CAN bus 380 from the network 310. In doing so, as the operation parameters are generated and/or adjusted during the operation of the electric delivery truck 110, the electric delivery truck monitoring system 315 may monitor the operation parameters in real-time via the network 315. Real-time is the monitoring of operation parameters as the operation parameters are generated during the current state of the electric delivery truck 110. Real-time is also the monitoring of operation parameters that are updated during periodic time intervals and provided to the electric delivery truck monitoring system 315 via the network 310 after each time interval is concluded.

In doing so, the electric delivery truck monitoring system 315 may assist the operation parameter controller 320 in adjusting the operation of the electric delivery truck 110 to increase the MPGe of the electric delivery truck when executing the route and thereby optimize the amount of power that is consumed by the electric delivery truck 110. In addition to monitoring the operation parameters as the electric delivery truck 110 operates, the electric delivery truck monitoring system 315 may also analyze past operation parameters generated by the electric delivery truck 110 when executing the route. Thus, the electric delivery truck monitoring system 315 may assist the operation parameter controller 320 in adjusting the operation of the electric delivery truck 110 based on not only the operation parameters generated by the electric delivery truck 110 during the execution of the current route but also the operation of the electric delivery truck 110 executed during the execution of past routes.

Figure 4:
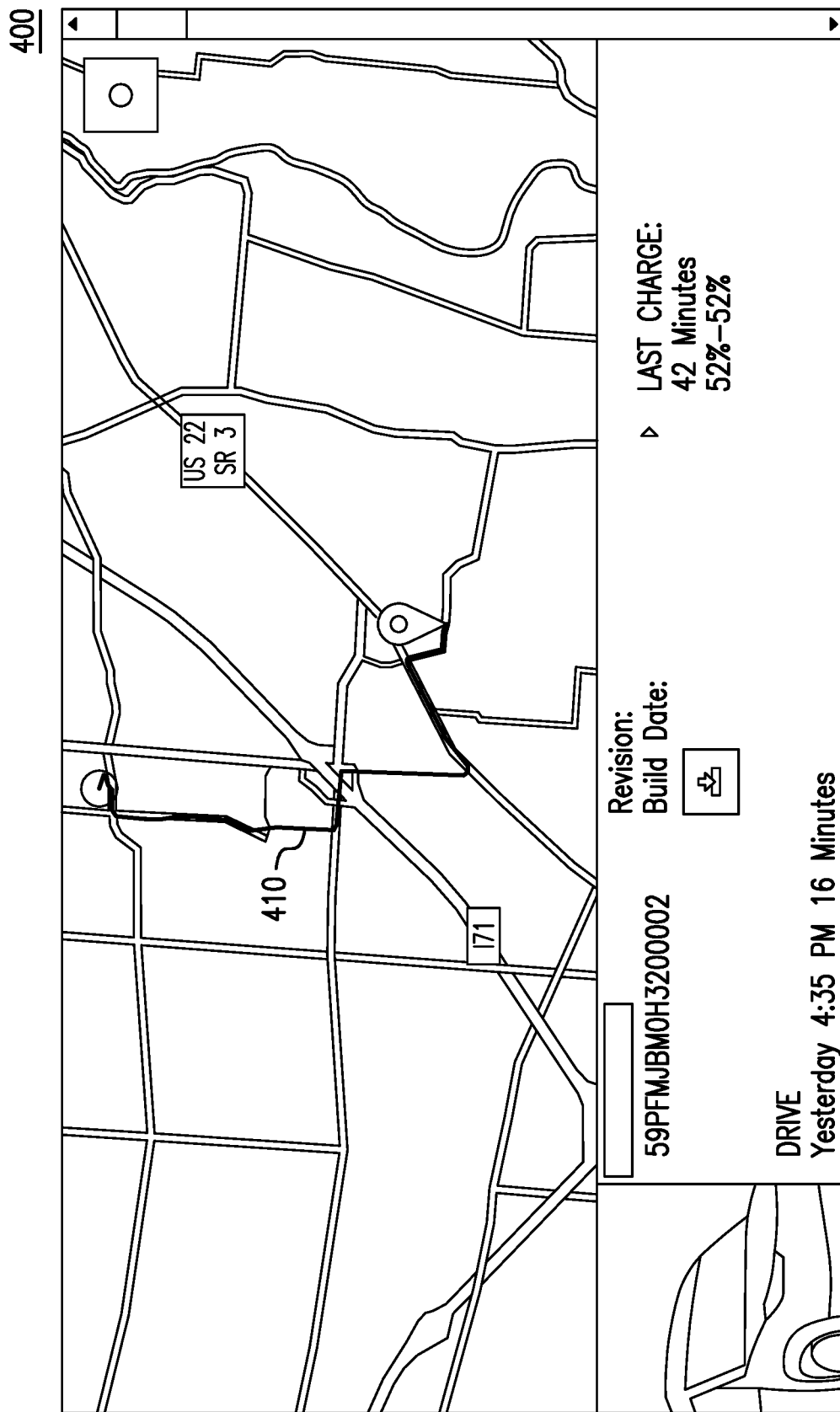
FIG. 4 illustrates an electric delivery truck monitoring configuration that may monitor the operation parameters generated by the execution of a first delivery route as the electric delivery truck executes the delivery route.

For example, as shown in the electric delivery truck monitoring configuration 400 depicted in FIG. 4, the electric delivery truck monitoring system 315 may monitor the operation parameters generated by the execution of a first delivery route 410 as the electric delivery truck 110 executes the first delivery route 410. The electric delivery truck monitoring system 315 may also monitor and store the operation parameters generated for each past execution of the first delivery route 410 by the electric delivery truck 110. In doing so, the electric delivery truck monitoring system 315 may incorporate the operation parameters generated by the execution of the first delivery route 410 as the electric delivery truck 110 executes the first delivery route 410 but also may incorporate the operation parameters generated by past executions of the first delivery route 410. Thus, in assisting the operation parameter controller 320 in adjusting the operation of the electric delivery truck 110 as the electric delivery truck 110 executes the first delivery route 410 increases the MPGe of the electric delivery truck 110 when executing the first delivery route 410.

In optimizing the amount of power that is consumed by the electric delivery truck 110 as the electric delivery truck 110 executes the route, the electric delivery truck monitoring system 315 may monitor numerous operation parameters associated with the electric delivery truck 110 executing the route and/or executing past routes that are indicative as to the power consumed by the electric delivery truck 110 when executing the route and/or past executions of the route. The monitoring of such operation parameters may be associated with the power efficiency generated by the operation of the electric delivery truck 110 when executing the route and/or past routes. In doing so, the electric delivery truck monitoring system 315 may monitor operation parameters that include battery management inputs that are detected by the battery management unit 385 and provided to the electric delivery truck monitoring system 315 via the CAN bus 380 and streamed to the electric delivery truck monitoring system 315 via the network 310. The battery management inputs are generated from a consumption of power from the overall power storage 365 of the electric delivery truck 110 as the electric delivery truck 110 operates. Thus, the electric delivery monitoring system 315 may assist the operation parameter controller 320 in adjusting the operation of the electric delivery truck 110 based on not only the operation parameters generated by the electric delivery truck 110 during the execution of the current route but also the operation of the electric delivery truck 110 executed during the execution of past routes.

For example, the electric delivery truck monitoring system 315 may monitor the battery management input of the voltage of the drive battery 365 via the battery management unit 385 as the electric delivery truck 110 operates to execute the route as well as the voltage of the drive battery 365 during past executions of the route. The voltage of the drive battery 365 may initiate at a first voltage value when the electric delivery truck 110 initiates the execution of the route. For example, the first voltage value when the electric delivery truck 110 initiates execution of the route is 4.1V. However, as the electric delivery truck 110 executes the route, the inverter 360 may pull DC power from the drive battery 365 and convert to AC power to drive the motor 375 during execution of the route. In doing so, the inverter 360 may not be converting AC generated from the motor 375 acting as a regenerator during the execution of the route to convert to DC power that is then stored in the drive battery 365 to equate to the amount of DC power pulled from the drive battery 365 that is converted to AC power to adequately drive the motor 375 during the execution of the route. Thus, the electric delivery truck monitoring system 315 may determine that the voltage of the drive battery 365 has decreased from 4.1V to the 3.2V during the execution of the route.

The voltage of the drive battery 365 enables the electric delivery truck monitoring system 315 to determine the state of charge of the drive battery 365. The electric delivery truck monitoring system 315 may then provide a range of the state of charge of the drive battery 365 as the electric delivery truck 110 operates to execute the route. For example, the electric delivery truck monitoring system 315 may determine the electric charge of the drive battery 365 when the electric delivery truck 110 initiates the execution of the route and then continues to determine the electric charge of the drive battery 365 as the electric delivery truck 110 executes the route. In such an example, the electric delivery truck monitoring system 315 may determine from the voltage of the drive battery 365 when the electric truck 110 initiates the execution of the route is 52% based on the voltage of 4.1V of the drive battery 365 and then the electric delivery truck monitoring system 315 may determine from the decreased voltage 3.2V of the drive battery when the electric truck 110 completes the execution of the route is 48% thereby providing a range of electric charge of the drive battery 365 during the execution of the route as ranging from 52% to 48%.

The voltage of the drive battery 365 also enables the electric delivery truck monitoring system 315 to determine the kWh of power storage available in the drive battery 365 as the electric delivery truck 110 operates to execute the route. The drive battery 365 may have an initial maximum capacity of power storage available upon being fully charged before the electric delivery truck 110 initiates the execution of the route. As the amount of DC power that is pulled from the drive battery 365 by the inverter 360 and converted to AC power to drive the motor 375 without regenerating the power to then be stored by the drive battery 365 during operation of the electric delivery truck 110, the amount of power storage of the drive battery 365 may decrease. Based on the decrease in voltage of the drive battery 365 that corresponds to the decrease in power storage, the electric delivery truck monitoring system 315 may determine the amount of kWh of power storage remaining in the drive battery 365 as the electric delivery truck 110 executes the route.

The amount of kWh of power storage available in the drive battery 365 as the electric delivery truck 110 operates to execute the route to enable the electric delivery truck monitoring system 315 to determine the MPGe of the electric delivery truck 110 as the electric delivery truck 110 operates to execute the route. The MPGe of the electric delivery truck 110 may provide insight as to the electric power efficiency of the electric delivery truck 110 as the electric delivery truck 110 operates. The electric delivery truck monitoring system 315 may then assist the operation parameter controller 320 as to automatically adjusting the operation of the electric delivery truck 110 as the electric delivery truck operates based on the MPGe of the electric delivery truck 110. In doing so, the operation parameter controller 320 may automatically adjust the operation of the electric delivery truck 110 to increase the MPGe of the electric delivery truck 110 as the electric delivery truck 110 executes the route thereby optimizing the amount of power that is consumed by the electric delivery truck 110 as the electric delivery truck 110 executes the route.

The electric delivery truck monitoring system 315 in assisting the operation parameter controller 320 in automatically adjusting the operation of the electric delivery truck 110, the battery management unit 385 associated with the electric delivery truck 110 may detect battery management inputs associated with an overall battery efficiency of the electric delivery truck 110 as the electric delivery truck 110 maneuvers along the roadway. The battery management inputs are generated from a consumption of power from the overall power storage 365 of the electric delivery truck 110 as the electric delivery truck 110 operates. The operation parameter controller 320 may then automatically adjust the operation of the electric delivery truck control inputs as the electric delivery truck 110 maneuvers along the roadway to maintain the operation of the electric delivery truck 110 within the operation threshold based on the detected battery management inputs and the electric delivery truck control inputs. In doing so, the overall battery efficiency of the electric delivery truck 110 is increased when executing the route by consuming power stored in the overall power storage 365 of the electric delivery truck 110.

For example, the electric delivery truck control unit 335 may detect an adjusted acceleration that corresponds to an adjusted position of the accelerator pedal 355 based on the driver attempting to increase a current acceleration with an adjusted position of the acceleration pedal. The operation parameter controller 320 may then determine whether the adjusted acceleration that corresponds to the adjusted position of the accelerator pedal 355 exceeds an acceleration threshold. The acceleration threshold when exceeded is indicative that the driver is attempting to increase the current acceleration in a decreased duration that is detrimental to operation of the electric delivery truck 110. The operation parameter controller 320 may then automatically adjust the operation of the electric delivery truck 110 to map a gradual acceleration that limits the increase in the current acceleration to an increased duration that maintains the adjusted acceleration within the acceleration threshold that is not detrimental to the operation of the electric delivery truck 110.

In such an example, the natural intelligence of the driver may trigger the driver to significantly press on the accelerator pedal 355 abruptly in order to accelerate quickly. The natural intelligence of the driver may then trigger the driver to significantly press on the brake pedal abruptly in order to decelerate quickly. The natural intelligence of the driver may then trigger the driver to continually repeat the significant pressing on the accelerator pedal 355 abruptly to accelerate quickly while significantly pressing on the brake pedal to abruptly stop throughout the execution of the route by the electric delivery truck 110. In doing so, the MPGe of the electric delivery truck 110 when executing the route is significantly impacted and decreases as well as the electric delivery truck 110 suffers unnecessary wear and tear due the abrupt accelerating and braking.

As shown in the electric delivery truck monitoring configuration 500 depicted in FIG. 5, the electric delivery truck monitoring system 315 may monitor the battery management input of state of charge 520 as well as the operation parameter 510 of vehicle speed as the electric delivery truck 110 executes the route. As shown in FIG. 5, the natural intelligence of the driver triggers the driver to significantly press on the accelerator pedal 355 thereby accelerating abruptly 530 and then the natural intelligence of the driver triggers the driver to significantly press on the brake pedal thereby braking abruptly 540. Corresponding to abrupt acceleration 530 and the abrupt braking 540, the state of charge 520 decreases from 52% state of charge 580 to 50% state of charge 560. As the natural intelligence of the driver triggers the drive to continue to abruptly accelerate and abruptly brake throughout the route, the state of charge continues to decrease down to 48% state of charge 570. Thus, the abrupt acceleration and abrupt braking triggered by the natural intelligence of the driver significantly impacts the MPGe of the electric delivery truck 110 when executing the route.

The operation parameter controller 320 may monitor the adjusted position of the accelerator pedal 355 to determine when the adjusted position of the accelerator pedal 355 corresponds to an adjusted acceleration that exceeds the acceleration threshold that is indicative that the abrupt acceleration attempted by the driver is detrimental to the operation of the electric delivery truck 110. As the operation parameter controller 320 determines that the adjusted position of the accelerator pedal 355 is corresponding to an increased acceleration that exceeds the acceleration threshold, the operation parameter controller 320 may automatically map a sloped and/or linear acceleration model to the acceleration of the electric delivery truck 110. In doing so, the abrupt acceleration and abrupt braking triggered by the natural intelligence of the driver is overridden by the operation parameter controller 320 and the electric delivery truck 110 executes the sloped and/or linear acceleration model mapped by the operation parameter controller 320. In doing so, the driver is prevented from abruptly accelerating and abruptly braking and rather the electric delivery truck 110 automatically accelerates and/or decelerates in sloped and/or linear manner. Thus, the MPGe of the electric delivery truck 110 when executing the route is increased due to preventing the detrimental operation of the electric delivery truck 110 by the driver.

The electric delivery truck monitoring system 315 may also assist the operation parameter controller 320 in automatically adjusting the operation of the electric delivery truck 110. The electric delivery truck monitoring system 315 may monitor the operation parameters included as battery management inputs such as the voltage of the drive battery 365, the state of charge of the drive battery 365, the kWh of storage of the drive battery 365, the MPGe of the electric delivery truck 110 and so on. As the electric delivery truck monitoring system 315 detects the battery management inputs are deviating from a threshold that is indicative that the performance of the electric delivery truck 110 is being negatively impacted, the electric delivery truck monitoring system 315 may notify the operation parameter controller 320 of such deviations. The operation parameter controller 320 may then automatically adjust the operation of the electric delivery truck 110 to compensate for the deviated battery management inputs.

In such an example, the electric delivery truck monitoring system 315 may identify that the state of charge of the drive battery 365 is decreasing as the driver abruptly accelerates and abruptly brakes. The electric delivery truck monitoring system 315 may notify the operation parameter controller 320 of such a decrease in the state of charge of the drive battery 365. The operation parameter controller 320 may then map the sloped and/or linear acceleration model to the electric delivery truck 110 thereby preventing the driver from abruptly acceleration and abruptly braking. In doing so, the decreasing state of charge of the drive battery 365 may be maintained resulting in an increase in the MPGe of the electric delivery truck 110 as the electric delivery truck 110 executes the route.

The electric delivery truck monitoring system 315 may monitor the acceleration of the electric delivery truck 110 as the electric delivery truck 110 operates to determine whether the acceleration of the electric delivery truck 110 exceeds an acceleration threshold. The acceleration threshold that when exceeded requires that the electric delivery truck monitoring system 315 instructs the operation parameter controller 320 to activate a first electric motor and a second electric motor. In doing so, the first electric motor and the second electric motor may generate sufficient energy such that the electric delivery truck 110 is able to attain the acceleration requested by the driver of the electric delivery truck 110.

The electric delivery truck monitoring system 315 may then monitor the acceleration of the electric delivery truck 110 as the electric delivery truck operates after the electric delivery truck 110 has reached a steady state in operation after acceleration to determine if the acceleration of the electric delivery truck 110 decreases below the acceleration threshold. After the acceleration of the electric delivery truck 110 has decreased below the acceleration threshold, the electric delivery truck monitoring system 315 may instruct the operation parameter controller 320 to deactivate the first electric motor while maintaining the second electric motor in an activated state. After the acceleration of the electric delivery truck 110 has decreased below the acceleration threshold, the electric delivery truck 110 no longer requires both the first electric motor and the second electric motor to be activated to generate sufficient energy for the electric delivery truck 110 to operate.

For example, the driver of the electric delivery truck 110 may request to accelerate the electric delivery truck to a speed of 55 mph. In order for the electric delivery truck 110 to accelerate to a speed of 55 mph, the electric delivery truck 110 requires 150 kW to accelerate to a speed of 55 mph. In doing so, the electric delivery truck monitoring system 315 may instruct the operation parameter controller 320 to activate both the first electric motor and the second electric motor once the driver accelerates the electric delivery truck 110 above the acceleration threshold. After the electric delivery truck 110 accelerates to a speed of 55 mph, the driver of the electric delivery truck 110 may allow the electric delivery truck 110 to reach a steady state of limited acceleration and then may allow the electric delivery truck 110 to decelerate to 45 mph. The electric delivery truck 110 requires 75 kW to decelerate and then operate at 45 mph. The activation of both the first electric motor and the second electric motor is not necessary to provide sufficient energy for the electric delivery truck 110 to decelerate and then operate at 45 mph. As a result, the electric delivery truck monitoring system 315 may then instruct the operation parameter controller 320 to deactivate the first electric motor while maintaining the second electric motor in an activate state to provide the sufficient energy for the electric delivery truck 110 to decelerate and operate at 45 mph after the acceleration of the electric delivery truck decreases below the acceleration threshold.

During deceleration below the acceleration threshold, the second electric motor that is activated while the first electric motor is deactivate, the second electric motor may generate energy that is then stored in the drive battery 365 as instructed by the operation parameter controller 320. As the electric delivery truck 110 decelerates below the acceleration threshold, the second electric motor is no longer required to generate energy to drive the electric delivery truck 110 but may rather operate to generate energy obtained from the kinetic energy generated as the electric delivery truck 110 operates along the roadway and the store such energy in the drive battery 365.

Rather than simply having the second electric motor generate energy to store in the drive batter 365 as the electric delivery truck 110 decelerates below the acceleration threshold, the electric delivery truck monitoring system 315 may instruct the operation parameter controller 320 to activate the first electric motor that was previously deactivated due to the first electric motor not required to adequately drive the electric delivery truck 110 as the electric delivery truck operates 110. In doing so, both the first electric motor and the second electric motor may generate energy from the kinetic energy generated as the electric delivery truck 110 operates and store such generated energy in the drive battery 110. Thus, additional energy may be stored in the drive battery 365 as the electric delivery truck 110 decelerates below the acceleration threshold from the activation of the first electric motor in addition to the second electric motor to as compared to just the second electric motor operating as the electric delivery truck 110 decelerates below the acceleration threshold.

The electric delivery truck monitoring system 315 may display the numerous different operation parameters that include the battery management inputs as the electric delivery truck monitoring system 315 monitors such operation parameters as the electric delivery truck 110 operates. The electric delivery truck monitoring system 315 may display the numerous different operation parameters that include the battery management inputs via user interface 350 as the numerous different operation parameters fluctuate as the electric delivery truck 110 operates. In doing so, a user that manages numerous electric delivery trucks 110 operating in a fleet may monitor the numerous different operation parameters that include the battery management inputs as operation parameters fluctuate as the electric truck delivery truck 110 operates.

For example, as shown in the electric truck delivery monitoring configuration 600 depicted in FIG. 6, the electric truck delivery monitoring system 315 may display to the user via user interface 350 numerous different operation parameters that include the battery management inputs as the electric delivery truck 110 operates. In such an example, the electric truck delivery truck monitoring configuration 600 displays to the user the total distance travelled by the electric delivery truck 110, the current drive energy in kWh, the efficiency in kWh per mile, the amount of miles that the electric delivery truck 110 has exceeded 55 MPh, the amount of miles the electric delivery truck has engaged in overboost, the quantity of stops, the range of state of charge during the route, current total efficiency in MPGe, current battery energy in kWh, the amount of regen braking in kWh, the amount of auxiliary energy in kWh, the current voltage for each battery cell included in the drive battery 365, the minimum temperature of the battery cells during the route, the maximum temperature of the battery cells during the route, and the current ambient temperature. The electric delivery truck monitoring configuration 600 may depict any type of operation parameter and/or battery management input that may assist the user in managing the electric delivery truck 110 that will be apparent to those skilled in the relevant art(s) without departing from the spirit and scope of the disclosure.

In doing so, the user may monitor the numerous different operation parameters including the battery management inputs as the electric delivery truck 110 operates to execute the route as displayed via user interface 350 to assist the user in optimizing delivery routes for the electric delivery truck 110 and to also optimize the efficiency of the electric delivery truck 110 when executing delivery routes. The user may analyze the numerous different operation parameters to determine the type of route that the electric delivery truck 110 should execute to optimize the efficiency of the electric delivery truck 110 when executing the route. The user may analyze the different routes and then the top speeds and energy usage and so on generated by the electric delivery truck 110 when executing each route to determine the route that has the increased energy efficiency for the electric delivery truck 110 to execute based on the numerous different operation parameters and battery management inputs displayed to the user via the user interface 350.

The electric truck delivery monitoring system 315 may also display to the driver via a user interface 350 positioned in the electric delivery truck 110 numerous different operation parameters that included the battery management inputs as the electric delivery truck 110 operates. In doing so, the driver may receive feedback in real-time as to the operation of the electric delivery truck 110 regarding the efficiency of the electric delivery truck 110 when executing the delivery route. The real-time feedback displayed to the driver enables the driver to increase the natural intelligence of the driver such that the driver may adjust how the driver is operating the electric delivery truck 110 to optimize the efficiency of the electric delivery truck 110 when executing the delivery route. For example, the user interface 350 positioned in the electric delivery truck 110 may display to the driver a rating system that may in real-time display to the driver a rating as to the efficiency of the electric delivery truck 110 when executing the route. In such an example, the rating system may be a star system where five stars are displayed when the electric delivery truck 110 is operating at optimal efficiency and then four stars are displayed when the electric delivery truck 110 is operating at less than optimal efficiency and so on.

The imaging device 340 may also identify the posted speed limit signs that are positioned along the segment of the roadway as well as any changes in the posted speed limit of the posted speed limit signs. A significant operation parameter for the segment of the roadway is the posted speed limit for the segment of the roadway. The electric delivery truck monitoring system 315 may monitor the posted speed limit for the segment of the roadway as detected by the imaging device 340. As the position of the electric delivery truck 110 changes in real-time, the imaging device 340 may capture the posted speed limit signs as the electric delivery truck 110 approaches each posted speed limit sign and the electric delivery truck monitoring system 315 may determine the current speed limit for the segment of the roadway that the electric delivery truck 110 is currently operating based on the posted speed limit sign captured by the imaging device 340. The electric delivery truck monitoring system 315 may then provide the current speed limit for the segment of the roadway that the electric delivery truck is currently operating to the operation parameter controller 320.

The operation parameter controller 320 may then automatically adjust the operation of the electric delivery truck 110 based on the current speed limit for the segment of the roadway that the electric delivery truck 110 is currently operating based as captured by the imaging device 340. The operation parameter controller 320 may ensure that the current speed that the electric delivery truck 110 is operating does not exceed the current speed limit for the segment of the roadway that the electric delivery truck 110 is currently operating. In doing so, the electric delivery truck 110 may ensure that the driver does not exceed the current speed limit for the segment of the roadway that the electric delivery truck 110 is currently operating. As a result, the MPGe of the electric delivery truck 110 is increased by preventing the driver from unnecessarily increasing the speed beyond the current speed limit of the segment of the roadway in which the electric delivery truck 110 is currently operating thereby increasing the MPGe of the electric delivery truck 110.

The imaging device 340 may then provide the electric delivery truck monitoring system 315 with any change in the posted speed limit signs and the electric delivery truck monitoring system 315 may then provide the changes in the posted speed limit signs to the operation parameter controller 320. The operation parameter controller 320 may then automatically adjust the speed of the electric delivery truck 110 to ensure that the speed of the electric delivery truck 110 does not increase above the change in the speed limit of the segment of the roadway that the electric delivery truck 110 is currently operating as provided by the change in the posted speed limit sign detected by the imaging device 340. In doing so, the driver is continuously prevented from exceeding the current speed of the segment of the roadway that the electric delivery truck 110 is currently operating thereby increasing the MPGe of the electric delivery truck 110.

In addition to the operation parameters provided by the CAN bus 380, the electric delivery truck monitoring system 315 may also monitor GPS data that is provided by the GPS 370 as the electric delivery truck 110 operates in executing the route. The GPS 370 may detect the position of the electric delivery truck 110 as the electric delivery truck 110 maneuvers along the roadway relative to the roadway and the driving environment of the electric delivery truck 110. As the position of the electric delivery truck 110 changes in real-time, the GPS 370 may provide the operation parameter of the position of the electric delivery tuck 110 to the operation parameter controller 320.

In doing so, the operation parameter controller 320 may automatically adjust the operation of the electric delivery truck 110 based on the position of the electric delivery truck 110 in real-time relative to the driving environment of the electric delivery truck 110. The operation parameter controller 320 may localize the position of the electric delivery truck 110 relative to the driving environment of the electric delivery truck 110 via the GPS 370 such that the operation parameter controller 320 may incorporate the localized position of the electric delivery truck 110 into the operation of the electric delivery truck 110. The operation parameter controller 320 may also localize the position of the electric delivery truck 110 relative to the driving environment of the electric delivery truck 110 via the GPS 370 such that the operation parameter controller 320 may incorporate the localized position of the electric delivery truck 110 relative to three-dimensional (3D) maps 395 of the driving environment.

The electric delivery truck monitoring system 315 may continuously stream 3D maps 315 of the driving environment based on position of the electric delivery truck 110 as detected by the GPS 370. The electric delivery truck monitoring system 315 may then incorporate the position of the electric delivery truck 110 as detected by the GPS 370 into the 3D maps 315 of the driving environment and then analyze the 3D maps 315 as the position of the electric delivery truck 110 changes in real-time relative to the driving environment as depicted in the 3D maps 315. The 3D maps 315 may provide numerous operation parameters that have terrain aspects of the driving environment in that the terrain aspects include characteristics of the driving environment that are associated with the geometry of the segment of the roadway as well as other aspects of the terrain surrounding the electric delivery truck 110 as the electric delivery truck 110 maneuvers along the segment of the roadway. Such terrain aspects may provide the operation parameter controller 320 with the insight as to the aspects associated with the geometry of the driving environment as well as other aspects of the terrain of the driving environment as the electric delivery truck 110 maneuvers along the segment of the roadway in real-time.

For example, the electric delivery truck monitoring system 315 may also identify the current speed limit of the segment of the roadway that the electric delivery truck 110 is currently operating as provided by the 3D maps 395 as well as any changes in the posted speed limit provided by the 3D maps 395. As the position of the electric delivery truck 110 changes in real-time, the 3D maps 395 may provide the position of the electric delivery truck 110 in real-time based on the position detected by the GPS. The electric delivery truck monitoring system 315 may then determine the current speed limit of the segment of the roadway that the electric delivery truck 110 is currently operating based on the position of the electric delivery truck 110 depicted in the 3D maps 395 and the corresponding speed limit provided by the 3D maps 395. and thereby provide the current speed limit of the segment of the roadway that the electric delivery truck 110 is currently operating from the speed limit signs that are provided by the 3D maps 395. The electric delivery truck monitoring system 315 may then provide the current speed limit for the segment of the roadway that the electric delivery truck 110 is currently operating to the operation parameter controller 320.

The operation parameter controller 320 may then automatically adjust the operation of the electric delivery truck 110 based on the current speed limit for the segment of the roadway that the electric delivery truck 110 is currently operating as provided by the 3D maps 395. The operation parameter controller 320 may ensure that the current speed that the electric delivery truck 110 is operating does not exceed the current speed limit for the segment of the roadway that the electric delivery truck 110 is currently operating. In doing so, the electric delivery truck 110 may ensure that the driver does not exceed the current speed limit for the segment of the roadway that the electric delivery truck 110 is currently operating. As a result, the MPGe of the electric delivery truck 110 is increased by preventing the driver from unnecessarily increasing the speed beyond the current speed limit of the segment of the roadway in which the electric delivery truck 110 is currently operating thereby increasing the MPGe of the electric delivery truck 110.

The 3D maps 395 may then provide the electric delivery truck monitoring system 315 with any change in the speed limits and the electric delivery truck monitoring system 315 may then provide the changes in the speed limits to the operation parameter controller 320. The operation parameter controller 320 may then automatically adjust the speed of the electric delivery truck 110 to ensure that the speed of the electric delivery truck 110 does not increase above the change in the speed limit of the segment of the roadway that the electric delivery truck 110 is currently operating as provided by the 3D maps 395. In doing so, the driver is continuously prevented from exceeding the current speed of the segment of the roadway that the electric delivery truck 110 is currently operating thereby increasing the MPGe of the electric delivery truck 110.

The GPS 370 may provide numerous operation parameters that have terrain aspects of the driving environment in that the terrain aspects include characteristics of the driving environment that are associated with the geometry of the roadway as well as other aspects of the terrain surrounding the electric delivery truck 110 as the electric delivery truck 110 maneuvers along the roadway. Such terrain aspects may provide the operation parameter controller 320 and/or the electric delivery truck monitoring system 315 with the insight as to the aspects associated with the geometry of the driving environment as well as other aspects of the terrain of the driving environment as the electric delivery truck 110 maneuvers along the roadway in real-time.

For example, the GPS 370 in real-time may provide driving parameters such as but not limited to ascending grades of the roadway, descending grades of the roadway, curvature of the roadway, terrain of the roadway, and/or any other type of operation parameter that is associated with the geometry and/or terrain of the segment of the roadway as the electric delivery truck 110 operates in the driving environment that will be apparent to those skilled in the relevant art(s) without departing from the spirit and scope of the disclosure. The operation parameter controller 320 may then incorporate the operation parameters provided by the GPS 370 and/or the insight provided by the electric truck delivery monitoring system 315 in real-time to adjust the operation of the electric delivery truck 110 in real-time based on the geometry and/or terrain of the roadway as identified by the operation parameters provided by the GPS 370.

As discussed in detail above, the operation parameter controller 320 may incorporate the operation parameters associated with the geometry and/or terrain of the roadway to automatically adjust the operation of the electric delivery truck 110 based on the geometry and/or terrain of the roadway. The geometry and/or terrain of the roadway as determined from the GPS 370 by the operation parameter controller 320 may have a significant impact as to how the operation parameter controller 320 adjusts the operation of the electric delivery truck 110 to accommodate for the geometry and/or terrain of the roadway. In doing so, the operation parameter controller 320 may determine the necessary operation parameters associated with the geometry and/or terrain of the roadway as determined from the GPS 370 to adjust the operation of the electric delivery truck 110 as the geometry and/or terrain of the segment of the roadway changes in real-time. The GPS 370 may provide any type of operation parameter to the operation parameter controller 320 that may enable the operation parameter controller 320 to automatically adjust the operation of the electric delivery truck 110 to account for the impact of the operation parameters provided by the GPS 370 that will be apparent to those skilled in the relevant art(s) without departing from the spirit and scope of the disclosure.

The operation parameter controller 320 may also monitor numerous operation parameters associated with the CAN bus 380 of the electric delivery truck 110. The CAN bus 380 may be receiving numerous signals triggered by numerous components and/or sensors associated with the electric delivery truck 110 as the electric delivery truck 110 maneuvers along the roadway. The operation parameter controller 320 may monitor the numerous operation parameters associated with the CAN bus 380 and then automatically adjust the operation of the electric delivery truck 110 based on the numerous operation parameters associated with the CAN bus 380.

The operation parameter controller 320 may identify a topological location of the electric delivery truck 110 based on a current topography of the driving environment that the electric delivery truck 110 is operating on the roadway. The operation parameter controller may determine whether the current topography associated with the topography location of the electric delivery truck 110 exceeds a topography threshold. The topography threshold when exceeded is indicative that the current topography of the driving environment that the electric delivery truck 110 is operating is increased thereby requiring increased power to be provided by the overall power storage 365 of the electric delivery truck 110 to assist the electric delivery truck 110 in operating the increased current topography. The operation parameter controller 110 may adjust the power provided to the electric motor 375 from the overall power storage 365 to increase the power provided to the electric motor 375 to accommodate for the increased current topography that exceeds the topography threshold.

The operation parameter controller 320 may determine whether the current topography associated with the current topography location of the electric delivery truck deviates below the topography threshold. The topography threshold when deviated below is indicative that the current topography of the driving environment that the electric delivery truck 110 is operating is decreased thereby requiring decreased power to be provided by the overall power storage 365 of the electric delivery truck 110. The operation parameter controller 320 may automatically adjust the power provided to the electric motor 375 from the overall power storage 365 to decrease the power provided to the electric motor 375 to enable additional power to be stored by the overall power storage 365 thereby enabling an increase in duration that the electric delivery truck 110 operates due to the additional power stored in the overall power storage 365.

The current topography of the electric delivery truck 110 may enable the operation parameter controller 320 and/or the electric delivery truck monitoring system 110 to customize the amount of power that is available to the electric delivery truck 110 as provided by the drive battery 365. For example, the electric delivery truck 110 that operates in a current topography that exceeds the topography threshold as in topographies that are significantly elevated, such as the Rocky Mountains, may require additional electric power provided by the drive battery 365 to adequately accelerate up the elevated topographies. Elevated topographies, such as mountainous regions, require additional power to accelerate the electrical delivery truck 110 up the elevated topographies as compared to the electric delivery truck 110 that operates in topographies with elevations that are below the topography threshold.

Thus, the operation parameter controller 320 may automatically provide additional power to the electric delivery truck 110 that has GPS coordinates provided by the GPS 370 that are within topographies that exceed the topography threshold to ensure that the electric delivery truck 110 is able to travel up the elevated topographies. However, providing increased power from the drive battery 365 results in the amount of power stored in the drive battery 365 to be consumed at a faster rate than the electric delivery truck 110 that operates in topographies with elevations that are below the topography threshold. As a result, the duration of operation of the electric delivery truck 110 that operates in topographies that exceed the topography threshold operate with a shorter duration than the electric delivery truck 110 that operates in topographies that are below the topography threshold.

In another example, the electric delivery truck 110 that operates in a current topography that is below the topography threshold as in topographies that are relatively flat, such as the corn fields of Iowa, may require less electric power provided by the drive battery 365 to adequately accelerate along the lower graded topographies. Lower graded topographies, such as the plain regions, require less power to accelerate the electric delivery truck 110 along the lower graded topographies as compared to the electric delivery truck 110 that operates in topographies with elevations that exceed the topography threshold.

Thus, the operation parameter controller 320 may automatically decrease the amount of power to the electric delivery truck 110 that has GPS coordinates provided by the GPS 370 that are within topographies that are below the topography threshold to ensure that the electric delivery truck 110 has an increased duration in operation. The electric delivery truck 110 that operates within topographies below the topography threshold does not require the power to accelerate along the lower graded topographies. Providing the additional power to the driver provides the risk that the natural intelligence of the driver may unnecessarily increase acceleration along the lower grade topographies resulting in unnecessarily decreasing the duration that the electric delivery truck 110 may operate based on the power stored in the drive battery 365. Thus, the operation parameter controller 320 may automatically limit the power available to the electric delivery truck 110 operates along topographies that are below the topography threshold to ensure that the duration of the electric delivery truck 110 that the electric delivery truck 110 may operate before the power stored in the drive battery 365 is drained is extended.

In an embodiment, the electric delivery truck monitoring system 315 may determine whether the current topography associated with the topography location of the electric delivery truck 110 based on geofencing. As discussed above, the GPS 370 may provide the current location of the electric delivery truck 110. The electric delivery truck monitoring system 315 may establish a geofence around a topographical region that is determined to have a topography that exceeds the topographical threshold. For example, the electric delivery truck 110 may establish a geofence around the Rocky Mountains as the Rocky Mountains have a topography that exceeds the topography threshold thereby triggering the electric delivery truck 110 that operates within the geofence around the Rocky Mountains to require additional power to adequately accelerate up the elevated topographies of the Rocky Mountains.

In doing so, the electric delivery truck monitoring system 315 may identify the current topography location of the electric delivery truck 110 based on the location of the electric delivery truck 110 provided by the GPS 370. The electric delivery truck monitoring system 315 may then determine that the current location of the electric delivery truck 110 is within the geofence that indicates that the current topography location of the electric delivery truck 110 exceeds the topographical threshold. The electric delivery truck monitoring system 315 may then instruct the operation parameter controller 320 to automatically increase the amount of power available to the electric delivery truck 110 based on the geofence that the current topographical location of the electric delivery truck 110 is within. The operation parameter controller 110 may then automatically provide the adequate amount of power to the electric delivery truck 110 to adequately climb the elevated topography.

The electric delivery truck monitoring system 315 may also establish a geofence around a topographical region that is determined to have a topography that is below the topographical threshold. For example, the electric delivery truck 110 may establish a geofence around the corn fields of Iowa as the corn fields of Iowa have a topography that is below the topography threshold thereby triggering the electric delivery truck 110 that operates within the geofence around the corn fields of Iowa to require less power to adequately accelerate along the lower graded topographies of the corn fields of Iowa thereby enabling the electric delivery truck 110 to have an increased duration in operation by decreasing the amount of unnecessary power required by the electric delivery truck 110 to operate along the lower graded topographies.

In doing so, the electric delivery truck monitoring system 315 may identify the current topography location of the electric delivery truck 110 based on the location of the electric delivery truck 110 provided by the GPS 370. The electric delivery truck monitoring system 315 may then determine that the current location of the electric delivery truck 110 is within the geofence that indicates that the current topography location of the electric delivery truck 110 that is below the topographical threshold. The electric delivery truck monitoring system 315 may then instruct the operation parameter controller 320 to automatically decrease the amount of power available to the electric delivery truck 110 based on the geofence that the current topographical location of the electric delivery truck 110 is within. The operation parameter controller 110 may then automatically provide the adequate amount of power to the electric delivery truck 110 to adequately operate the lower grade topography while extending the duration of the operation of the electric delivery truck 110 by preventing the electric delivery truck 110 from unnecessarily consuming power provided by the drive battery 365.

The electric delivery truck monitoring system 315 may also enable the user to monitor the location of the electric delivery truck 110 in real-time as well as the number of stops the electric delivery truck 110 has executed in real-time when executing the route as well as the duration of time in real-time since the last charge of the electric delivery truck 110 as well as the range of charge of the drive battery 365 in real-time of the electric delivery truck 110 as the electric delivery truck 110 executes the route. For example, returning to FIG. 4, the electric delivery truck monitoring configuration 400 displays to the user via the user interface 350, the location of the electric delivery truck 110 in real-time as well as the route that the electric delivery truck 110 has travelled in real-time as well as the duration of time in real-time since the last charge as well as the range of charge of the drive battery 365.

In doing so, the user may monitor in real-time the current location of the electric delivery truck 110 as well as the current state of the drive battery 365 of the electric delivery truck 110 in relation to the route already executed by the electric delivery truck as well as the route remaining for the electric delivery truck 110 to execute. The user may then monitor the performance of the electric delivery truck 110 in real-time in relation to the route and may intervene to assist the driver that is operating the electric delivery truck 110 to ensure that the operation of the electric delivery truck 110 is optimized when conducting the route. The electric delivery truck monitoring system 110 may display to the user via the user interface 350 any type of operation parameter that may assist the user in tracking the performance of the electric delivery truck 110 when executing the route that will be apparent to those skilled in the relevant art(s) without departing from the spirit and scope of the disclosure.

In addition to assisting the user in tracking a single electric delivery truck 110, the electric delivery truck monitoring system 315 may enable the user to track numerous electric delivery trucks 110 that are included in a fleet of electric delivery trucks 110 that the user is required to manage. Numerous electric delivery trucks 110 included in the fleet may be operating and executing numerous different routes in numerous different locations simultaneously. The electric delivery truck monitoring system 315 may enable the user to track the performance, location, and so on of the numerous different electric delivery trucks 110 operating and executing routes simultaneously. In doing so, the user may adequately manage the numerous different electric delivery trucks 110 included in the fleet that the user is required to manage based on the numerous operation parameters associated with the numerous different electric delivery trucks 110 that are generated in real-time and provided to the user to view via user interface 350 by the electric delivery truck monitoring system 315. For example, the electric delivery truck monitoring system 315 may display warnings associated with the numerous electric delivery trucks 110 as those warnings are generated to the user via the user interface 350.

The electric delivery truck monitoring system 315 may be a device that is capable of electronically communicating with other devices. Examples of the electric delivery truck monitoring system 315 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Electric Delivery Truck Control Detection Configuration

The electric delivery truck control system configuration 300 as shown in FIG. 3 also includes an electric delivery truck control unit 335 that detects a brake pedal 345 of the electric delivery truck 110 and an accelerator pedal 355 of the electric delivery truck 110. The electric delivery truck control unit 335 may detect operation parameters associated with the control of the electric delivery truck 110 as the electric delivery truck 110 operates. The operation parameter controller 320 may then incorporate the operation parameters into the automatic adjustment of the electric delivery truck 110 as the electric delivery truck 110 operates. In doing so, the operation parameter controller 320 may adjust the vehicle systems 390 of the electric delivery truck 110.

The electric delivery truck control unit 335 detects a plurality of electric delivery truck control inputs, such as but not limited inputs generated from the brake pedal 345, accelerator pedal 355, and so on, that are associated with an operation of the electric delivery truck 110 as the electric delivery truck 110 maneuvers along the roadway. The electric delivery truck control inputs are generated from a longitudinal operation of the electric delivery truck 110. The electric delivery truck control inputs provide insight to the operation parameter controller 320 as to the state of the control of the electric delivery truck 110 in real-time as well as the intent of the driver with regard to operating the electric delivery truck 110 in real-time. The operation parameter controller 320 may then incorporate the electric delivery truck control inputs into the automatic adjustment of the operation of the electric delivery truck 110 to account for the current state of the control of the electric delivery truck 110 as well as the intent of the driver with regard to operating the electric delivery truck 110.

For example, the electric delivery truck control inputs provide insight as to the current state of the control of the electric delivery truck 110 as well as the intent of the driver such as but not limited to the deceleration and/or braking of the electric delivery truck 110 based on the brake pedal 345, the acceleration and/or increase in operating speed of the electric delivery truck 110 based on the accelerator pedal 355, and/or any other type of electric delivery truck control input that is indicative as to the current state of the operation of the electric delivery truck 110 and/or the intent of the driver that will be apparent to those skilled in the relevant art(s) without departing from the spirit and scope of the disclosure.

The operation parameter controller 320 may then automatically adjust the operation of the electric delivery truck 110 as the electric delivery 110 maneuvers along the roadway to maintain the operation of the electric delivery truck 110 within the operation threshold based on the detected electric delivery truck control inputs. Each of the electric delivery truck control inputs detected by the electric delivery truck control unit 335 may enable the operation parameter controller 320 to automatically adjust the operation of the electric delivery truck 110 to accommodate for the current state of the operation of the electric delivery truck 110 as well as the driver intent in real-time.

The operation parameter controller 320 may identify each electric delivery truck control input as detected by the electric delivery truck control unit 335 in real-time as the electric delivery truck 110 maneuvers along the roadway. The operation parameter controller 320 may determine a current state of the operation of the electric delivery truck 110 and a driver intent from each electric delivery truck control input as the electric delivery truck 110 is operating in real-time. The current state of the operation of the electric delivery truck 110 is indicative as to a current position of the electric delivery truck 110 as the electric delivery truck 110 is operating in real-time and the driver intent is an intent that the driver requests to operate the electric delivery truck 110 in real-time. The operation parameter controller 320 may then automatically adjust the operation of the electric delivery truck 110 as the electric delivery truck 110 maneuvers along the roadway to accommodate for the current state of the operation of the electric delivery truck 110 and the driver intent of the electric delivery truck 110 in real-time.

Rather than ignore the current state of the operation of the electric delivery truck 110 as well as the driver intent, operation parameter controller 320 may identify each electric delivery truck control input and the corresponding state of the electric delivery truck 110 based on each electric delivery truck control input and then automatically adjust the operation of the electric delivery truck 110 based on the current state of the electric delivery truck 110 and the driver intent. For example, the vehicle systems 390 may include but are not limited to the engine controller, brakes, steering, throttle, and/or any other type of system of the electric delivery truck 110 that trigger the electric delivery 110 to operate.

For example, the current status of the brake pedal 345 in real-time as the electric delivery truck 110 maneuvers along the roadway may indicate to the operation parameter controller 320 as to whether the electric delivery truck 110 is currently braking and thereby decelerating. The operation parameter controller 320 may determine that the electric delivery truck 110 is not currently in the braking status when there is no pressure applied to the brake pedal 345. In doing so, the operation parameter controller 320 may automatically adjust the operation of the electric delivery truck 110 as the electric delivery truck 110 maneuvers along the roadway based on the assumption that the electric delivery truck 110 is not currently braking. Further, the operation parameter controller 320 may determine that the electric delivery truck 110 is currently in the braking status when there is pressure applied to the brake pedal 345. In doing so, the operation parameter controller 320 may automatically adjust the operation of the electric delivery truck 110 as the electric delivery truck 110 maneuvers along the roadway based on the assumption that the electric delivery truck 110 is currently braking.

In another example, the current status of the accelerator pedal 355 in real-time as the electric delivery truck 110 maneuvers along the roadway may indicate to the operation parameter controller 320 as to whether the electric delivery truck 110 is currently accelerating due to the driver applying pressure to the accelerator pedal 355. The operation parameter controller 320 may determine that the electric delivery truck is not currently in the accelerating status when there is no pressure applied to the accelerator pedal 355. In doing so, the operation parameter controller 320 may automatically adjust the operation of the electric delivery truck 110 as the electric delivery truck 110 maneuvers along the roadway based on the assumption that the electric delivery truck 110 is not currently accelerating. Further, the operation parameter controller 320 may determine that the electric delivery truck 110 is currently in the acceleration status when there is pressure applied to the accelerator pedal 355. In doing so, the operation parameter controller 320 may automatically adjust the operation of the electric delivery truck 110 as the electric delivery truck 110 maneuvers along the roadway based on the assumption that the electric delivery truck 110 is currently accelerating.

Additional Features

Returning to FIG. 3, the drive battery 365 may include battery modules 325(*a-n*), where n is an integer equal to or greater than one. The greater amount of drive modules 325(*a-n*) that the drive battery 365 includes then the greater amount of power capacity that may be provided by the drive battery 365 to the electric delivery truck 110 as the electric delivery truck 110 operates. As the electric delivery truck 110 requires additional power capacity to complete an extended route, the electric delivery truck 110 requires an increased amount of battery modules 325(*a-n*) to have the power capacity to provide sufficient power to the electric delivery truck 110 as the electric delivery truck 110 executes the extended route. However, the electric delivery truck 110 that executes a route of decreased duration, the electric delivery truck 110 may not require the power provided by the power capacity of the increased battery modules 325(*a-n*). In having increased battery modules 325(*a-n*) that are not required to provide the amount of power required for the electric delivery truck 110 to execute the route of decreased duration, simply adds unnecessary weight to the electric delivery truck 110. The added unnecessary weight of the increased battery modules 325(*a-n*) decreases the MPGe of the electric delivery truck executes the route of decreased duration.

Often times, the electric delivery truck 110 may execute delivery routes of different durations. For example, the electric delivery truck 110 may execute delivery routes of increased duration during the holiday season as the amount of stops per delivery route is significantly increased due to the significant increase in packages that are required to be delivered during the holiday season. In such an example, the duration of the delivery routes executed by the electric delivery truck 110 may be significantly increased in order for the increased amount of packages to be delivered in a timely manner. However, during other times of the year that are outside of the holiday season, the duration of the delivery routes executed by the electric delivery route 110 may be significantly decreased from the duration of the delivery routes executed during the holiday season due to a significant decrease in the amount of packages that are required to be delivered.

Delivery routes of increased duration require that the electric delivery truck 110 have an increased power capacity in order for the electric delivery truck 110 to have sufficient power to complete the delivery routes of increased duration. In doing so, the electric delivery truck 110 requires that the drive battery 365 include increased battery modules 325(*a-n*) in order to have the increased power capacity such that the electric delivery truck has sufficient power to complete the electric delivery routes of increased duration. The increased battery modules 325(*a-n*) increase the weight of the electric delivery truck 110 but that increased weight is necessary to have the power capacity to execute the routes of increased duration.

However, the electric delivery truck 110 may not be required to execute the routes of increased duration throughout the year but may be required to execute routes of decreased duration. The execution of routes of decreased duration do not require the power capacity to be provided by the drive battery 365 as the routes of increased duration thereby requiring a decreased battery modules 325(*a-n*). The electric delivery truck 110 operating with increased battery modules 325(*a-n*) when executing routes of decreased duration unnecessarily adds weight to the electric delivery truck thereby decreasing the MPGe of the electric delivery truck 110 when executing the routes of decreased duration as the electric delivery truck 110 does not require the additional power capacity provided by the increased battery modules 325(*a-n*).

Rather than having different electric delivery trucks 110 with different quantities of battery modules 325(*a-n*) to be used for the execution of different duration of routes in order to have the appropriate power capacity for each route while not having unnecessary weight, the drive battery 365 may be modular in that different quantities of battery modules 325(*a-n*) may be added or removed from the drive battery 365 to customize the power capacity of the electric delivery truck 110 to the duration of the route that the electric delivery truck 110 is executing. In doing so, the amount of battery modules 325(*a-n*) may be added to the drive battery 365 when the electric delivery truck 110 is executing routes of increased duration thereby providing sufficient power capacity to the electric delivery truck 110 to execute the routes of increased duration. The amount of battery modules 325(*a-n*) may be removed from the drive battery 365 when the electric delivery truck 110 is executing routes of decreased duration thereby providing sufficient power capacity to the electric delivery truck 110 to execute routes of decreased duration while not unnecessarily additional weight to the electric delivery truck 110 when executing routes of decreased duration.

As the battery modules 325(*a-n*) are added to the drive battery 365 or removed from the drive battery 365, the operation parameter controller 320 may recognize the adjusted amount of battery modules 325(*a-n*) and account for the adjusted amount of power capacity available to the electric delivery truck 110 when adjusting the operation of the electric delivery truck 110. In an embodiment, a first battery module 325*a* may be a chief battery module in that the first battery module 325*a* is always installed into the drive battery 365. In doing so, even if the drive battery 365 includes a single battery module, that single battery module is battery module 325*a* and operates as the chief battery. Then, the operation parameter controller 320 may recognize when additional battery modules 325(*b-n*) are added to the drive battery 365 due to the presence of the additional battery modules 325(*b-n*) in addition to the first battery module 325*a* on the CAN bus 380. The operation parameter controller 320 may then operate the electric delivery truck 110 based on the battery modules 325(*a-n*) on the CAN bus 380. The operation parameter controller 320 may then recognize when the additional battery modules 325(*b-n*) are removed from the drive battery 365 due to the lack of presence of the additional battery modules 325(*b-n*) in addition to the first battery 325*a* on the CAN bus 380. The electric delivery truck monitoring system 315 may also recognize the quantity of battery modules 325(*a-n*) included in the drive battery 365 in a similar manner.

The drive battery 365 may be air cooled with fans. The fans may face up into the electric delivery truck 110 and generate air that is directed up a center plenum that provides cool air or heated air to the drive battery 365 via in inlet and/or outlet that are both included in the center plenum. A coupling positioned on the center plenum simply needs to be moved to transition the air provided to the drive battery 365 from cooled air to heated air and vice versa thereby automatically conditioning the drive battery 365 with air. Rather than being water cooled that requires water lines and electrical lines to be connected to transition the air from being cool air or heated air and vice versa and having to bleed bubbles out of the water lines after each transition, the coupling may simply be transitioned to transition the air from cooled air to heated air.

An air-conditioner compressor 375 may be a high voltage air conditioner that includes a single air-conditioner compressor 375. A first evaporator may be dedicated to the cab for the driver. A second evaporator may be dedicated to the drive battery 365. The operation parameter controller 320 may monitor the temperature of the drive battery 365 as well as the temperature of the cab. As the temperature of the drive battery 365 increases above a battery temperature threshold that is indicative that the drive battery 365 requires additional cooling, the operational parameter controller 320 may automatically divert cooled air from the evaporator associated with the cab to the evaporator associated with the drive battery 365. In doing so, additional cooled air is diverted to the drive battery 365 thereby decreasing the temperature of the drive battery 365 after the temperature exceeds the battery temperature threshold.

The electric delivery truck 110 may include a high voltage drive for external pumps and/or external generators and/or any other electronic device that requires high voltages to operate. The high voltage drive may be connected to the drive battery 365. The operation parameter controller 320 may recognize when a high voltage device is plugged into the high voltage drive connector. Rather than providing a constant high voltage to the high voltage device, the operation parameter controller 320 may dynamically adjust the constant high voltage provided to the high voltage device based on the operation parameters of the electric delivery truck 110. The operation parameter controller 320 recognizes the radius required for the electric delivery truck 110 to arrive at a home base to repower. Thus, the operation parameter controller 320 may decrease the high voltage provided to the high voltage device as the power level of the drive battery 365 begins to decrease below a power level threshold that may jeopardize the electric delivery truck 110 from having sufficient power to arrive back at the home base. For example, the high voltage drive may provide high voltage sufficient to drive an external pump. The high voltage drive may provide high voltage sufficient to drive external light sources. However, the operation parameter controller 320 may decrease the high voltage provided to the external pump and/or external light source to ensure that the electric delivery truck 110 may arrive at home base without depleting the drive battery 365 of power.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. An electric delivery truck control system to automatically manage a plurality of operation parameters of an electric delivery truck as the electric delivery truck operates, comprising:
  a plurality of sensors associated with the electric delivery truck that is configured to detect the operation parameters associated with the electric delivery truck, wherein the operation parameters are indicative to an operation of the electric delivery truck as the electric delivery truck maneuvers on the a roadway;
  an electric vehicle electronic control unit (EV-ECU) associated with the electric delivery truck and comprising a first processor and a first memory having a first plurality of instructions stored therein that, in response to execution by the first processor, causes the EV-ECU to:
    detect a plurality of electric delivery truck control inputs generated from the operation of the electric delivery truck as the electric delivery truck maneuvers along the roadway, and
    detect an acceleration of the electric delivery truck as the electric delivery truck operates; and
  an operation parameter controller associated with the electric delivery truck and comprising a second processor and a second memory having a second plurality of instructions stored therein that, in response to execution by the second processor, causes the operation parameter controller to:
    automatically adjust the operation of the electric delivery truck within an operation threshold based on the detected operation parameters and electric delivery truck control inputs, wherein the electric delivery truck is maintained within the operation threshold when the operation of the electric delivery truck maintains power consumed by the electric delivery truck within an overall power storage of the electric delivery truck for a duration of time of the electric delivery truck executing a route thereby enabling the electric delivery truck to execute the route by consuming power stored in the overall power storage of the electric delivery truck,
    determine whether the acceleration of the electric delivery truck decreases below an acceleration threshold, wherein a decrease below the acceleration threshold is indicative that a first electric motor is deactivated and a second electric motor is activated to drive the electric delivery truck as the electric delivery truck operates,
    automatically activate the first electric motor and maintain the activation of the second electric motor for the first electric motor and the second electric motor to generate energy converted from kinetic energy generated from the operation of the electric delivery truck when operating below the acceleration threshold, and
    store the energy generated by the first electric motor and the second electric motor that is converted from the kinetic energy generated from the operation of the electric delivery truck when operating below the acceleration threshold in a battery management unit associated with the electric delivery truck.

2. The electric delivery truck control system of claim 1, wherein the plurality of sensors further comprise:
  an imaging device configured to detect a plurality of visual detection operation parameters that are associated with the electric delivery truck as the electric delivery truck maneuvers along the roadway, wherein the visual detection operation parameters are driving parameters that are visually identifiable as detected by the imaging device and are indicative to the driving environment that the electric delivery truck is operating.

3. The electric delivery truck control system of claim 2, wherein the second memory having the second plurality of instructions that causes the operation parameter controller to:
  identify an object positioned in a drive path of the electric delivery truck as the electric delivery truck maneuvers along the roadway;
  transition an electric motor included in the electric delivery truck from operating as the electric motor to operating as an electric generator by transitioning the electric motor from operating in a drive mode to a reverse mode in response to the identification of the object positioned in the drive path; and
  automatically remove power that is available to accelerate the electric delivery truck and store the captured power in the overall power storage of the electric delivery truck thereby triggering the speed of the electric delivery truck to automatically decrease, wherein the automatic decrease in speed enables a driver of the electric delivery truck to avoid the object positioned in the drive path of the electric delivery truck.

4. The electric delivery truck control system of claim 2, wherein the second memory having the second plurality of instructions that causes the operation parameter controller to:
  identify a position of the electric delivery truck as detected by the imaging device in real-time relative to a lane included in the roadway that the electric delivery truck is maneuvering;
  determine when the position of the electric delivery truck relative to a center position of the lane deviates beyond a lane center threshold in real-time thereby indicating that the electric delivery truck is deviating from the lane; and automatically alert the driver that the position of the electric delivery truck is deviated beyond the lane center threshold indicating to the driver that the driver is to adjust the position of the electric delivery truck to be within the lane center threshold.

5. The electric delivery truck control system of claim 2, wherein the imaging device is further configured to captured a speed limit posted by a speed limit sign that is positioned on a segment of the roadway that the electric delivery truck is currently operating.

6. The electric delivery truck control system of claim 5, wherein the second memory having the second plurality of instructions that causes the operation parameter controller to:

identify the speed limit associated with the segment of the roadway that the electric delivery truck is currently operating as captured by the imaging device from the speed limit sign positioned on the segment of the roadway that the electric delivery truck is currently operating;

automatically adjust a speed of the electric delivery truck to prevent the speed of the electric delivery truck from exceeding the speed limit as the speed limit captured by the imaging device from the speed limit sign changes.

7. The electric delivery truck control system of claim 1, wherein the first memory having the first plurality of instructions that causes the EV-ECU to detect an adjusted position of the accelerator pedal that corresponds to an adjusted acceleration based on the driver attempting to increase a current acceleration with the adjusted position of the accelerator pedal.

8. The electric delivery truck control system of claim 7, wherein the second memory having the second plurality of instructions that causes the operation parameter controller to:

determine whether the adjusted acceleration that corresponds to the adjusted position of the accelerator pedal exceeds an acceleration threshold, wherein the acceleration threshold when exceeded is indicative that the driver is attempting to increase the current acceleration in a decreased duration that is detrimental to operation of the electric delivery truck; and automatically adjust the operation of the electric delivery truck to map a linear acceleration that transitions the increase in the current acceleration as generated by the adjusted position of the accelerator pedal to a linear increase in the current acceleration over an increased duration of time that maintains the adjusted acceleration within the acceleration threshold.

9. The electric delivery truck control system of claim 1, wherein the operation parameter controller is further configured to:

identify a topographical location of the electric delivery truck based on a current topography of the driving environment that the electric delivery truck is operating on the roadway;

determine whether the current topography associated with the topography location of the electric delivery truck exceeds a topography threshold, wherein the topography threshold when exceeded is indicative that the current topography of the driving environment that the electric delivery truck is operating is increased thereby requiring increased power to be provided by the overall power storage of the electric delivery truck to assist the electric delivery truck in operating the increased current topography; and automatically adjust power provided to the electric motor from the overall power storage to increase the power provided to the electric motor to accommodate for the increased current topography that exceeds the topography threshold.

10. The electric delivery truck control system of claim 9, wherein the operation parameter controller is further configured to:

determine whether the current topography associated with the topography location of the electric delivery truck deviates below the topographical threshold, wherein the topography threshold when deviated below is indicative that the current topography of the driving environment that the electric delivery truck is operating is decreased thereby requiring decreased power to be provided by the overall power storage of the electric delivery truck;

automatically adjust the power provided to the electric motor from the overall power storage to decrease the power provided to the electric motor to enable additional power to be stored by the overall power storage thereby enabling an increase in duration that the electric delivery truck operates due to the additional power stored in the overall power storage.

11. The electric delivery truck control system of claim 1, wherein the plurality of sensors further comprise:

a battery management unit associated with the electric delivery truck that is configured to detect a plurality of battery management inputs associated with an overall battery efficiency of the electric delivery truck as the electric delivery truck maneuvers along the roadway, wherein the battery management inputs are generated from a consumption of power from the overall power storage of the electric delivery truck as the electric delivery truck operates.

12. The electric delivery truck control system of claim 11, wherein the operation parameter controller is further configured to:

automatically adjust the operation of the electric delivery truck control inputs as the electric delivery truck maneuvers along the roadway to maintain the operation of the electric delivery truck within the operation threshold based on the detected battery management inputs and the electric delivery truck control inputs and thereby increase the overall battery efficiency of the electric delivery truck when executing the route by consuming power stored in the overall power storage of the electric delivery truck.

13. A method for automatically managing a plurality of operation parameters of an electric delivery truck as the electric delivery truck operates, comprising:

detecting the operation parameters associated with the electric delivery truck, wherein the operation parameters are indicative to an operation of the electric delivery truck as the electric delivery truck maneuvers on a roadway;

detecting a plurality of electric delivery truck control inputs generated from an operation of the electric delivery truck as the electric delivery truck maneuvers along the roadway;

detecting an acceleration of the electric delivery truck as the electric delivery truck operates;

automatically adjusting the operation of the electric delivery truck within an operation threshold based on the detected operation parameters and the electric truck control inputs;

maintaining the electric delivery truck within the operation threshold when the operation of the electric delivery truck maintains power consumed by the electric delivery truck within an overall power storage of the electric delivery truck for a duration of the electric delivery truck executing a route thereby enabling the electric delivery truck to execute the route by consuming power stored in the overall power storage of the electric delivery truck;

determining whether a first electric motor is activated and a second electric motor is activated based on whether the acceleration of the electric delivery truck decreases below an acceleration threshold;

automatically activating the first electric motor and maintaining the activation of the second electric motor when operating below the acceleration threshold to convert energy from kinetic energy generated from the operation of the electric delivery truck; and storing the energy converted by the first electric motor and the second electric motor from the kinetic energy in a battery management unit associated with the electric delivery truck.

14. The method of claim 13, wherein the detecting of the plurality of operation parameters comprises:

detecting a plurality of visual detection operation parameters that are associated with the electric delivery truck as the electric delivery truck maneuvers along the roadway, wherein the visual detection operation parameters are driving parameters that are visually identifiable as detected by the imaging device and are indicative to the driving environment that the electric delivery truck is operating.

15. The method of claim 14, wherein the automatic adjusting of the operation of the electric delivery truck comprises:

identifying an object positioned in a drive path of the electric delivery truck as the electric delivery truck maneuvers along the roadway;

transitioning an electric motor included in the electric delivery truck from operating as the electric motor to operating as an electric generator by transitioning the electric motor from operating in a drive mode to a reverse mode in response to the identification of the object positioned in the drive path; and automatically remove power that is available to accelerate the electric delivery truck and store the captured power in the overall power storage of the electric delivery truck thereby triggering the speed of the electric delivery truck to automatically decrease, wherein the automatic decrease in speed enables a driver of the electric delivery truck to avoid the object positioned in the drive path of the electric delivery truck.

16. The method of claim 13, wherein the automatic adjusting of the operation of the electric delivery truck further comprises:

identifying a position of the electric delivery truck as detected in real-time relative to a lane included in the roadway that the electric delivery truck is maneuvering;

determining when the position of the electric delivery truck relative to a center position of the lane deviates beyond a lane center threshold in real-time thereby indicating that the electronic delivery truck is deviating from the lane; and automatically alerting the driver that the position of the electric delivery truck is deviated beyond the lane center threshold indicating to the driver that the driver is to adjust the position of the electric delivery truck to be within the lane center threshold.

17. The method of claim 16, wherein the detecting of the plurality of operation parameters further comprises:

capturing a speed limit posted by a speed limit sign that is positioned on a segment of the roadway that the electric delivery truck is currently operating.

18. The method of claim 17, wherein the automatic adjusting of the electric delivery truck further comprises:

identifying the speed limit associated with the segment of the roadway that the electric delivery truck is currently operating as captured from the speed limit sign positioned on the segment of the roadway that the electric delivery truck is currently operating;

automatically adjust a speed of the electric delivery truck to prevent the speed of the electric delivery truck form exceeding the speed limit as the speed limit captured by the imaging device from the speed limit sign changes.

19. The method of claim 13, wherein the detecting of the plurality of operation parameters further comprises:

detecting an adjusted position of the accelerator pedal that corresponds to an adjusted acceleration based on the driver attempting to increase a current acceleration with the adjusted position of the accelerator pedal.

20. The method of claim 19, wherein the automatic adjusting of the operation of the electric delivery truck further comprises:

determining whether the adjusted acceleration that corresponds to the adjusted position of the accelerator pedal exceeds an acceleration threshold, wherein the acceleration threshold when exceeded is indicative that the driver is attempting to increase the current acceleration in a decreased duration that is detrimental to operation of the electric delivery truck; and automatically adjusting the operation of the electric delivery truck to map a linear acceleration that that transitions the increase in the current acceleration as generated by the adjusted position of the accelerator pedal to a linear increase in the current acceleration over an increased duration of time that maintains the adjusted acceleration within the acceleration threshold.

21. The method of claim 20, further comprising:

identifying a topographical location of the electric delivery truck based on a current topography of the driving environment that the electric delivery truck is operating on the roadway;

determining whether the current topography associated with the topography location of the electric delivery truck exceeds a topography threshold, wherein the topography threshold when exceeded is indicative that the current topography of the driving environment that the electric delivery truck is operating is increased thereby requiring increased power to be provided by the overall power storage of the electric delivery truck to assist the electric delivery truck in operating the increased current topography; and automatically adjusting power provided to the electric motor from the overall power storage to increase the power provided to the electric motor to accommodate for the increased current topography that exceeds the topography threshold.

22. The method of claim 21, further comprising:

determining whether the current topography associated with the topography location of the electric delivery truck deviates below the topographical threshold, wherein the topography threshold when deviated below is indicative that the current topography of the driving environment that the electric delivery truck is operating is decreased thereby requiring decreased power to be provided by the overall power storage of the electric delivery truck; and automatically adjusting the power provided to the electric motor from the overall current power storage to decrease the power provided to the electric motor to enable additional power to be stored by the overall power storage thereby enabling an increase in duration that the electric delivery truck operates due to the additional power stored in the overall power storage.

23. The method of claim 13, further comprising:

detecting a plurality of battery management inputs associated with an overall battery efficiency of the electric delivery truck as the electric delivery truck maneuvers along the roadway, wherein the battery management inputs are generated from a consumption of power from the overall power storage of the electric delivery truck as the electric delivery truck operates.

24. The method of claim 23, further comprising:

automatically adjusting the operation of the electric delivery truck as the electric delivery truck control inputs as the electric delivery truck maneuvers along the roadway to maintain the operation of the electric delivery truck within the operation threshold based on the detected battery management inputs and the electric delivery truck control inputs and thereby increase the overall battery efficiency of the electric delivery truck when executing the route by consuming power stored in the overall power storage of the electric delivery truck.

* * * * *